US011077816B1

(12) United States Patent
Bates et al.

(10) Patent No.: US 11,077,816 B1
(45) Date of Patent: Aug. 3, 2021

(54) RESTRAINT SURFACE ADJUSTMENT SAFETY SYSTEM

(71) Applicant: Zoox, Inc., Foster City, CA (US)

(72) Inventors: Mark Alan Bates, Kenilworth (GB); Markus Jost, San Mateo, CA (US); David Maurice Libeaut, Bidford-on-Avon (GB); Andrew John Piper, Palo Alto, CA (US); Kern Rameshwar Sharma, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 133 days.

(21) Appl. No.: 16/453,560

(22) Filed: Jun. 26, 2019

(51) Int. Cl.
 *B60R 21/207* (2006.01)
 *B60R 21/013* (2006.01)
 *B60R 21/01* (2006.01)
 *B60R 21/23* (2006.01)

(52) U.S. Cl.
 CPC ............ *B60R 21/207* (2013.01); *B60R 21/01* (2013.01); *B60R 21/013* (2013.01); *B60R 21/23* (2013.01); *B60R 2021/01034* (2013.01); *B60R 2021/01211* (2013.01); *B60R 2021/01286* (2013.01)

(58) Field of Classification Search
 None
 See application file for complete search history.

(56) References Cited

U.S. PATENT DOCUMENTS

| | | | |
|---|---|---|---|
| 9,108,584 B2 * | 8/2015 | Rao | B60R 21/203 |
| 10,647,286 B1 | 5/2020 | Dennis et al. | |
| 2019/0106215 A1 * | 4/2019 | Penley | B60R 21/23 |
| 2019/0126878 A1 | 5/2019 | Fukawatase et al. | |
| 2019/0299902 A1 * | 10/2019 | Nagasawa | B60N 2/002 |

FOREIGN PATENT DOCUMENTS

| | | | | |
|---|---|---|---|---|
| JP | 2002079862 A | * | 3/2002 | |
| JP | 2008162546 A | * | 7/2008 | |

* cited by examiner

*Primary Examiner* — Faye M Fleming
(74) *Attorney, Agent, or Firm* — Lee & Hayes, P.C.

(57) ABSTRACT

A safety system for vehicle may include a restraint surface adjustment mechanism for adjusting at least one of a height or an angle of a restraint surface disposed under a vehicle seat during a collision and/or predicted collision in which the vehicle seat is facing in the direction of travel and/or the direction of the oncoming collision. The seat may comprise a bench seat including a first seating space and a second seating space. A first restraint surface adjustment mechanism may be associated with the first seating space and a second restraint surface adjustment mechanism may be associated with the second seating space. The restraint surface adjustment mechanism may include, for example, an inflatable bladder, a movable plate which rotates about an axis, or other restraint surface adjustment mechanisms that adjust at least one of the height, angle, or physical property (e.g., rigidity) of one or more restraint surfaces.

20 Claims, 10 Drawing Sheets

RESTRAINT SURFACE ADJUSTMENT SAFETY SYSTEM

BACKGROUND

During a vehicle collision, occupants of the vehicle may be injured due to impact with an interior of the vehicle or other objects. To minimize injury to vehicle occupants, restraints such as seatbelts are commonly used to couple the occupant to the vehicle seats. For example, in the case of a head-on or "forward-facing" collision, seatbelts including lap and shoulder belts may apply substantial forces to restrain the vehicle occupant. These forces can cause chest and/or pelvic "deflection." When the force imparted by the seatbelts becomes too great, the chest and/or pelvis deflection may injure the occupant.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
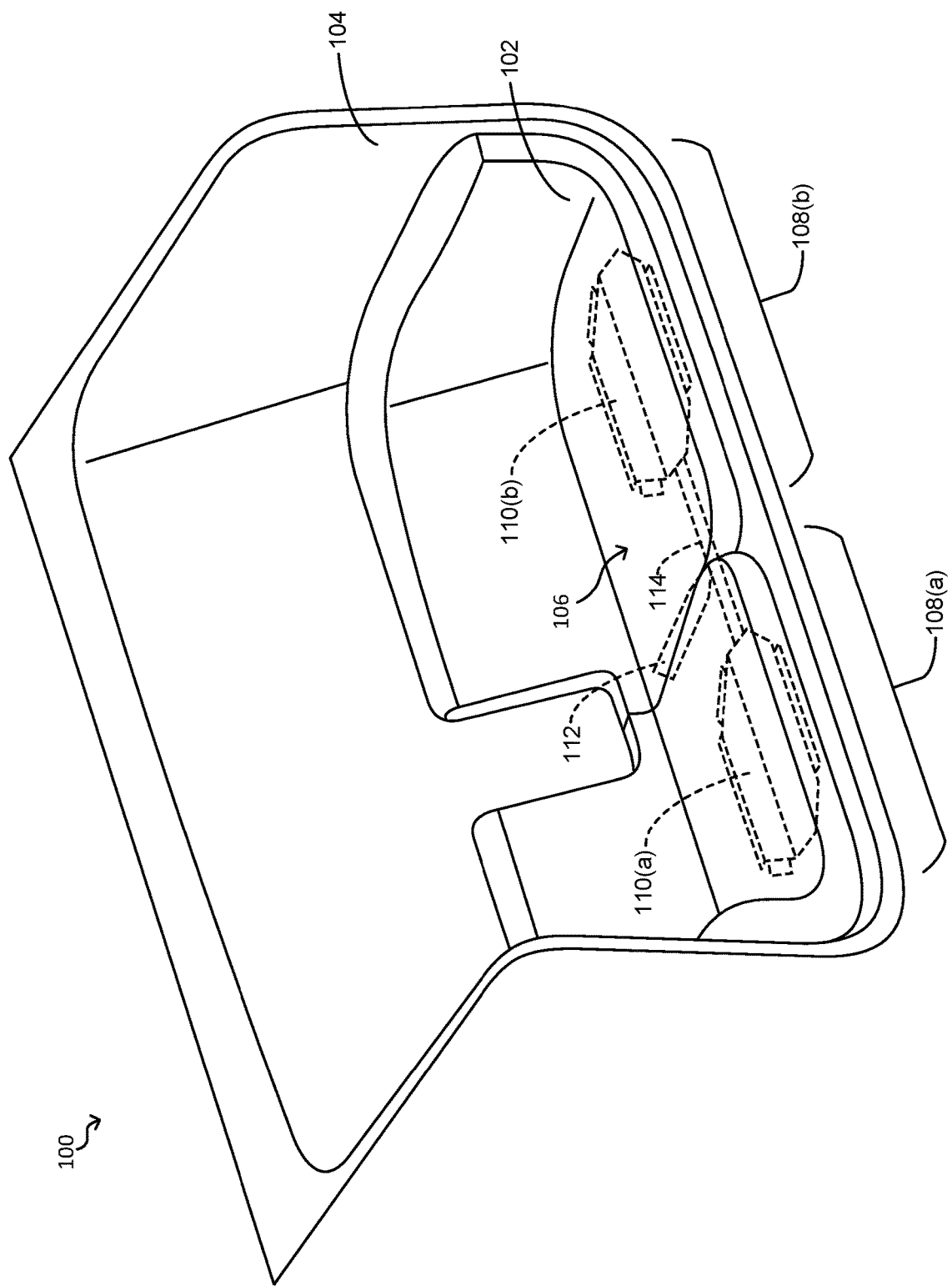
FIG. 1 illustrates a perspective view of an example bench-type seat comprising a restraint surface adjustment mechanism.

As briefly noted above, during a vehicle collision, occupants of the vehicle may be injured due to impact with an interior of the vehicle or other objects. To minimize injury to vehicle occupants, restraints such as seatbelts are commonly used to couple the occupant to the vehicle seats. However, in some instances, such as during a head-on or "forward-facing" collision, forces imparted by the seatbelts can become too great and can injure the occupant. One approach to reduce occupant injury due to excessive forces exerted by seatbelts is to use a traditional airbag-restraint system. However, as discussed further below, using a traditional airbag-restraint system (e.g., deployed from the dashboard or steering column) is sometimes impracticable or even impossible.

This disclosure relates to example safety systems which, among other things, actuate an example restraint surface adjustment mechanism associated with a vehicle seat to adjust an angle of the restraint surface during a vehicle collision to help restrain an occupant, thereby reducing an amount of force exerted on the occupant by a shoulder belt, lap belt, or other occupant restraint. The restraint surface adjustment mechanisms described herein can help minimize chest and/or pelvis deflection of an occupant during a collision by restraining or coupling the pelvis of the occupant and thereby reducing injuries and improving safety of the vehicle. The techniques described herein may also be beneficial for occupants seated in a reclined seating position, in which their upper torso is reclined by greater than 20 degrees to the vertical (e.g., at any angle between 20 degrees and horizontal (lying down)). In such cases, traditional restraint systems such as seatbelts and airbags may have limited effectiveness. The techniques described herein may be used to provide additional restraint of an occupant during a forward-facing collision and/or other type of collision.

In some examples, the techniques described herein can be applied to a bidirectional vehicle. A bidirectional vehicle is one that is configured to switch between traveling in a first direction of the vehicle and a second, opposite, direction of the vehicle. In other words, there is no fixed "front" or "rear" of the vehicle. Rather, whichever longitudinal end of the vehicle is leading at the time becomes the "front" and the trailing longitudinal end becomes the "rear." In other examples, the techniques described herein may be applied to vehicles other than bidirectional vehicles. In some examples, whether or not a vehicle is bidirectional, the techniques described herein can be applied to any vehicle type comprising occupant seating. For instance, as used herein, the term "vehicle" may be used to refer to an automobile (e.g., a car, truck, bus, motorhome/recreational vehicle, etc.), an off-road vehicle (e.g, an all-terrain-vehicle (ATV), utility-vehicle (UTV), side-by-side, etc.), a train (e.g., a freight train, passenger train, locomotive, monorail, subway, hyperloop, etc.), an aircraft (e.g., fixed wing plane, helicopter, etc.), a vessel (e.g., a boat, ship, barge, submarine, etc.), spacecraft, or any other type of transportation system with seated occupants. In some examples, the vehicle may include one or more bench-type seats, each of which may include one or multiple seat spaces where an individual occupant may be seated. For instance, a bench-type seat may comprise a first seat space for a first occupant and a second seat space for a second occupant. In some examples, the one or more bench-type seats may be arranged in a "carriage-style" seating orientation with a first bench-type seat oriented facing a second bench-type seat. In the case of a bidirectional vehicle, when the vehicle is moving in a first direction, the first bench-type seat is forward facing (i.e., faces in the first direction of the vehicle), while the second bench-type seat is rearward facing (i.e., faces in the second, opposite direction of the vehicle). In other examples, multiple bench-type seats may be oriented facing in a same direction (e.g., in rows).

In a carriage seating configuration such as that described above, and in other types of seating configurations, it may not be practicable to use a traditional airbag-restraint system because there may not be any dashboard or steering column to stow and/or support the traditional airbag-restraint system. As such, in some examples, alternative techniques may be used for mitigating chest and/or pelvic deflection of an occupant during a forward-facing collision and/or other type of collision. One example method for mitigating chest and/or pelvic deflection of an occupant is by adjusting an angle of a restraint surface or "ramp angle" of the occupant's seat. As used herein, the terms "restraint surface angle" and "ramp angle" refer to an angle between an x-axis (e.g., horizontal axis) and a plane created by a restraint surface disposed in, on, or beneath of a seat-tub, cushion, or other portion of a seat-bottom of a vehicle seat. In some examples, an angle of a restraint surface may be adjusted by, for example, increasing a height of at least a first portion (e.g., front) of the restraint surface relative to a second portion (e.g., rear) of the restraint surface and/or decreasing a height of at least the second portion (e.g., rear) of the restraint surface relative to the first portion (e.g., front) of the restraint surface.

A seat with a relatively flat (e.g., horizontal) restraint surface angle may provide a comfortable or natural seating position for an occupant, but will provide little resistance or restraint to an occupant during a forward-facing collision. In that case, the occupant may be restrained primarily by the seatbelt and may, therefore, experience more chest and/or pelvic deflection than an occupant in a seat with a steeper restraint surface angle. This is because a seat surface and/or seat bottom with a steeper restraint surface angle will help restrain or couple a pelvis of the occupant, thereby reducing a load borne by the seat belt or other restraint mechanism. However, a seat surface and/or seat bottom having a restraint surface angle that is steep enough to effectively mitigate chest and/or pelvic deflection during a forward-facing collision may be less for an occupant to sit in during normal operation. This application describes example techniques for adjusting an angle of a restraint surface to couple or restrain the pelvis of an occupant and thereby absorb impact from the occupant during a forward-facing collision, which may reduce forces applied to the occupant by a seatbelt or other restraint while maintaining passenger comfort during normal vehicle operation.

In some examples, a safety system for a seat in a vehicle may comprise a seat cushion, a seat tub, and a restraint surface adjustment system to adjust a height and/or angle of at least a portion of a restraint surface of the seat. In some examples, the seat may comprise a bench-type seat for accommodating multiple occupants (e.g., 2, 3, 4, or more occupants). Additionally, or alternatively, the seat may comprise a first seat space for a first occupant and a second seat space for a second occupant. In some examples, the seat tub may be disposed under the seat cushion, and at least a portion of the restraint surface adjustment system may be disposed between the seat cushion and the seat tub. In some examples, at last a portion of the restraint surface adjustment system may be disposed under the seat tub, and the seat tub may be disposed under the seat cushion. In some examples, the restraint surface may be disposed in, on, and/or under the seat cushion, the seat tub, and/or other components of a seat-bottom of the vehicle seat.

In some examples, the restraint surface adjustment system may comprise one or more restraint surface adjustment mechanisms. The restraint surface adjustment mechanism(s) may be disposed under the first seat space and/or the second seat space of the seat cushion to adjust a restraint surface angle of the first seat space, the second seat space, the seat cushion, and/or the seat tub. In some examples, the restraint surface adjustment mechanism may comprise an inflatable bladder. The inflatable bladder may be inflated with a gas and/or fluid supplied by an inflator upon the vehicle's detection of a forward-facing collision and/or predicted collision to adjust a restraint surface angle of at least one of the seat cushion, the seat tub, or other component of the seat-bottom of an individual seat space. In some examples, a single bladder or other restraint surface adjustment mechanism may be used to adjust a restraint surface angle of multiple seat spaces. The inflatable bladder may comprise or be constructed in whole or in part of steel (e.g., carbon steel, stainless steel, or other steel alloy), aluminum or aluminum alloy, rubber, nylon, polyamide, or another material. In some examples, the inflator supplying the gas and/or fluid to inflate the bladder may produce the gas and/or fluid by a pyrotechnic reaction within the inflator.

In some examples, the restraint surface adjustment mechanism may comprise a pivotable, slidable, or otherwise movable plate or other structural member. The plate or structural member may be actuated by an actuator such that, when force is applied to a portion of the plate or structural member, the plate or structural member adjusts a restraint surface angle of at least a portion of at least one of the seat cushion, seat tub, or an individual seat space. In some examples, the plate or structural member comprises a hinge or is pinned so that it is pivotable about a pivot point. The actuator may comprise, for example, a spring, a hydraulic actuator, a pneumatic actuator, a motor, an electro-magnet, or a pyro-technic device, or any other device for applying force to a portion of the plate or other structural member to adjust the restraint surface angle underneath at least a portion of at least one of the seat cushion, seat tub, or an individual seat space.

In some examples, the restraint surface adjustment mechanism may comprise an adjustable material configured to change material property responsive to application of one or more stimuli (e.g., an electric field, magnetic field, heat, etc.). By way of example and not limitation, adjustable materials may include a shape memory material (SMM), shape-memory alloy, shape-memory polymer, electroactive polymer, magnetostrictive material, magnetic shape memory alloy, dielectric elastomer, or any other material that changes size, shape, rigidity, elasticity, and/or other physical properties responsive to one or more stimuli. In some examples, when the adjustable material of the restraint surface adjustment mechanism may be transitioned between a first state (inactive state) having a first physical property (e.g., size, shape, rigidity, and/or elasticity) and a second state (an activated state) having a second physical property (e.g., size, shape, rigidity, and/or elasticity) that is different than the first physical property. For instance, the first physical property may comprise a first rigidity at which the adjustable material is relatively easily compressed or deformed to provide occupant comfort, while the second physical property may be a rigidity that is greater than the first rigidity in order to more firmly restrain or couple the pelvis of occupant during a collision or predicted collision.

In some examples, the restraint surface adjustment mechanism may comprise a first restraint surface adjustment mechanism and a second restraint surface adjustment mechanism. For instance, the first restraint surface adjustment mechanism may be disposed under the first seat space to adjust a restraint surface angle associated with the first seat space. Additionally, the second restraint surface adjustment mechanism may be disposed under the second seat space to adjust a restraint surface angle associated with the second seat space. In some examples, the first restraint surface adjustment mechanism may comprise a first inflatable bladder and the second restraint surface adjustment mechanism may comprise a second inflatable bladder. In other examples, the first restraint surface adjustment mechanism may comprise a first hinged-plate or pivotable device and the second restraint surface adjustment mechanism may comprise a second hinged-plate or pivotable device.

In some examples in which the restraint surface adjustment mechanism comprises a first inflatable bladder and a second inflatable bladder, the first inflatable bladder and the second inflatable bladder may be inflated at the same time and/or rate, or at substantially the same time and/or rate, by an inflator. For instance, the inflator may be disposed approximately halfway between the first inflatable bladder and the second inflatable bladder such that the gas and/or fluid supplied by the inflator flows substantially equally or evenly into each inflatable bladder. Additionally, or alternatively, the inflator may be disposed under the seat tub, between the seat tub and the seat cushion, or in another location of the vehicle or the seat.

In some examples, the inflator may be in fluid-communication with the first inflatable bladder and the second inflatable bladder via a manifold and one or more bladder-inflation tubes. In some examples, the manifold may comprise an inlet and one or more outlets. For instance, the manifold may comprise an inlet orifice connected to the inflator and an outlet orifice connected to at least one of the first inflatable bladder or the second inflatable bladder via one or more bladder inflation tubes. In other examples, the manifold may comprise an inlet orifice connected to the inflator, a first outlet orifice connected to the first inflatable bladder via a first bladder inflation tube, and a second outlet orifice connected to the second inflatable bladder via a second bladder inflation tube. In some examples, the manifold inlet orifice may comprise a circular funnel shape, and the outlet orifice may comprise an oval or oblong funnel shape to allow gas and/or fluid to flow to the first inflatable bladder and the second inflatable bladder at substantially the same time and/or in equal proportion. In other examples, the manifold may comprise a "T" shaped fitting, a "Y" shaped fitting, or another manifold style.

In some examples, the manifold may comprise internal architecture. For instance, the manifold may comprise one or more dividers, vanes, diaphragms, and/or other structures for directing fluid and/or gas to a specific inflatable bladder. Additionally, or alternatively, the manifold may comprise one or more valves for stopping, limiting, or controlling the flow of gas and/or fluid to one or more inflatable bladders.

In some examples, the manifold may be in fluid-communication with the first inflatable bladder and the second inflatable bladder via one or more bladder-inflation tubes. For instance, the one or more bladder inflation tubes may comprise a single bladder inflation tube. In such an instance, an outlet orifice of the manifold may be connected to a side-wall of the bladder inflation tube at a perpendicular angle. In other instances, the one or more bladder inflation tubes may comprise a first bladder inflation tube and a second bladder inflation tube. The first bladder inflation tube may be in fluid communication with the first inflatable bladder and the first outlet orifice of the manifold, and the second bladder inflation tube may be in fluid communication with the second inflatable bladder and the second outlet orifice of the manifold.

In some examples, the safety system of the vehicle may comprise one or more processors, one or more sensors, and/or memory. The memory may store computer-executable instructions which cause the one or more processors to perform various actions. For instance, the one or more processors may detect a collision and/or predicted collision of the vehicle based at least in part on receiving data from the one or more sensors. Additionally, or alternatively, the one or more processors may cause the restraint surface adjustment mechanism(s) of the seat of the vehicle to actuate, thereby adjusting the restraint surface angle of the seat to restrain an occupant during a forward-facing collision and/or predicted collision.

In some examples, the one or more processors of the vehicle may determine a travel direction associated with the vehicle and/or whether a seat of the vehicle faces in the same direction as the direction of travel based at least in part on receiving data from the one or more sensors. For instance, the vehicle may comprise carriage-type seating, wherein a first seat faces in a first direction and a second seat faces in a second direction, opposite the first direction. As such, when the vehicle is operating in the first direction, the first seat is facing in the direction of travel and the second seat is facing opposite to the direction of travel and vice versa.

In some examples, the one or more processors may determine a direction of a collision associated with the vehicle. For instance, the one or more processors may determine if the vehicle is going to be impacted by another vehicle (e.g., a rear-end collision where the other vehicle collides with the rear of the vehicle). In such examples, the one or more processors may determine which direction a colliding vehicle is approaching from and, in response, determine a vehicle seat facing in the direction from which the colliding vehicle is approaching. In this way, a restraint surface of a vehicle seat may be increased and/or adjusted to couple the pelvis of an occupant, thereby reducing chest and/or pelvic deflection and reducing the likelihood that the occupant may experience injury or contact with another object of the vehicle.

In some examples, the one or more processors of the vehicle may determine one or more characteristics associated with one or more occupants of the vehicle. For instance, the one or more processors may receive data from one or more sensors of the vehicle indicating a body weight associated with an occupant seated in a seat space of the vehicle. Additionally, or alternatively, the one or more processors may determine the presence of a child-restraint seat disposed on a seat space of the vehicle. In this way, the one or more processors may selectively determine whether or not to actuate a restraint surface adjustment mechanism of the seat of the vehicle in the event of a collision.

In some examples, the techniques described herein for elevating a restraint surface associated with a vehicle seat to couple the pelvis of an occupant may additionally or alternatively be implemented in anticipation of, during, and/or responsive to braking, acceleration, cornering, and other vehicle operations detected be one or more vehicle sensors. As an example, when a vehicle comprising carriage seating accelerates, the restraint surface of the vehicle seat may be elevated and/or actuated to restrain a vehicle occupant seated in a seat facing opposite to the direction of travel/acceleration of the vehicle (e.g., facing a trailing end of the vehicle). As another example, a laterally positioned restraint surface of a vehicle seat (e.g., a restraint surface positioned to offer support to an occupant's hips) may be utilized to restrain an occupant from sliding laterally on the vehicle seat when the vehicle is cornering. In such examples as those described above, the restraint surface of the vehicle seat may be lowered and/or deactivated after the one or more vehicle sensors indicate that the vehicle operation (e.g., accelerating, braking, cornering, predicted collision) is no longer occurring or present.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting examples. The features illustrated or described in connection with one example may be combined with the features of other embodiments, including as between systems and methods. Such modifications and variations are intended to be included within the scope of the appended claims. As used herein, the words "example," "exemplary" or "illustrative" mean "serving as an example, instance, or illustration." Any implementation described herein as an "example" or as being "exemplary" or "illustrative" should not be construed as preferred or advantageous over other implementations. All implementations described below are exemplary implementations provided to enable persons having ordinary skilled in the art to make or use embodiments of the disclosure and are not intended to limit the scope of the disclosure, which is defined by the claims.

FIG. 1 illustrates an example perspective view of a seat 100, which in this example is illustrated as a bench-type seat. The seat 100 includes a restraint surface adjustment system to adjust a restraint surface angle of one or more restraint surfaces of the seat 100. The seat 100 may comprise, a seat cushion 102, seat tub 104, and a restraint surface adjustment system 106. As shown in the exemplary figure, seat tub 104 may be disposed under and/or behind seat cushion 102. In some instances, seat tub 104 may further be disposed under the restraint surface adjustment system 106. However, in other instances, the restraint surface adjustment system 106 may be disposed under seat tub 104. In some examples, the seat 100 can be fixedly mounted to a body or frame of the vehicle (e.g., seat cushion 102 and/or seat tub 104 may be fixedly mounted to the body or the frame of the vehicle).

In some examples, seat cushion 102 may comprise one or more seat spaces for accommodating multiple occupants, such as seat space 108(a) and seat space 108(b). Additionally, seat cushion 102 may comprise any finite number of seat spaces for accommodating an occupant. Seat cushion 102 may additionally comprise a seat bottom cushion and a seat back cushion for occupant safety and comfort. Seat cushion 102 may further comprise multiple and/or modular cushions. For instance, seat cushion 102 may comprise a first seat bottom cushion for a first seat space, such as seat space 108(a), a second seat bottom cushion for a second seat space, such as seat space 108(b), as well as first and second seat back cushions for the respective first and second seat spaces.

In some examples, the restraint surface adjustment system 106 may comprise one or more restraint surface adjustment mechanisms, such as inflatable bladders 110(a) and 110(b). Additionally, the restraint surface adjustment system 106 may comprise any finite number of restraint surface adjustment mechanisms and is not limited to the two restraint surface adjustment mechanisms shown in exemplary FIG. 1. The inflatable bladders 110(a) and 110(b) may be disposed under seat cushion 102. Additionally, or alternatively, inflatable bladders 110(a) and 110(b) may be disposed under seat tub 104. Additionally, or alternatively, inflatable bladder 110(a) may be disposed under seat space 108(a), and inflatable bladder 110(b) may be disposed under seat space 108(b). In some examples, inflatable bladders 110(a) and 110(b) may be inflated during a collision and/or a predicted collision to adjust a restraint surface angle associated with at least one of seat space 108(a), seat space 108(b), seat cushion 102, and/or seat tub 104. In some examples, inflatable bladders 110(a) and 110(b) may comprise or be constructed in whole or in part steel (e.g., carbon steel, stainless steel, or other steel alloy), aluminum or aluminum alloy, rubber, nylon, polyamide, or another material.

In some examples, the restraint surface adjustment system 106 may also comprise an actuator for actuating one or more restraint surface adjustment mechanisms to adjust a restraint surface angle of a seat. For instance, a restraint surface adjustment system comprising inflatable bladders like those shown in FIG. 1 may comprise an inflation-type actuator, such as inflator 112. In some examples, upon the vehicle's detection of a forward-facing collision and/or predicted collision, inflator 112 may be actuated to fill at least one of inflatable bladder 110(a) or inflatable bladder 110(b) with a gas or fluid. In some examples, inflator 112 may implement a pyrotechnic reaction to create a gas or fluid for inflating inflatable bladders 110(a) and/or 110(b). By way of example and not limitation, the gas or fluid may comprise nitrogen gas, air, carbon dioxide, hydraulic fluid, or any other working fluid.

In examples where the restraint surface adjustment system 106 comprises one or more inflatable bladders, such as the example shown in FIG. 1, the restraint surface adjustment system 106 may comprise one or more bladder inflation tubes, such as bladder inflation tube 114. The bladder inflation tube 114 may be in fluid communication with inflatable bladder 110(a), inflatable bladder 110(b), and/or inflator 112. In some examples, the bladder inflation tube 114 may comprise a manifold disposed between bladder inflation tube 114 and inflator 112 to allow gas and/or fluid to freely flow from inflator 112 to inflatable bladders 110(a) and 110(b), such that inflatable bladders 110(a) and 110(b) may be inflated at the same time and from the same inflator 112.

Figure 2:
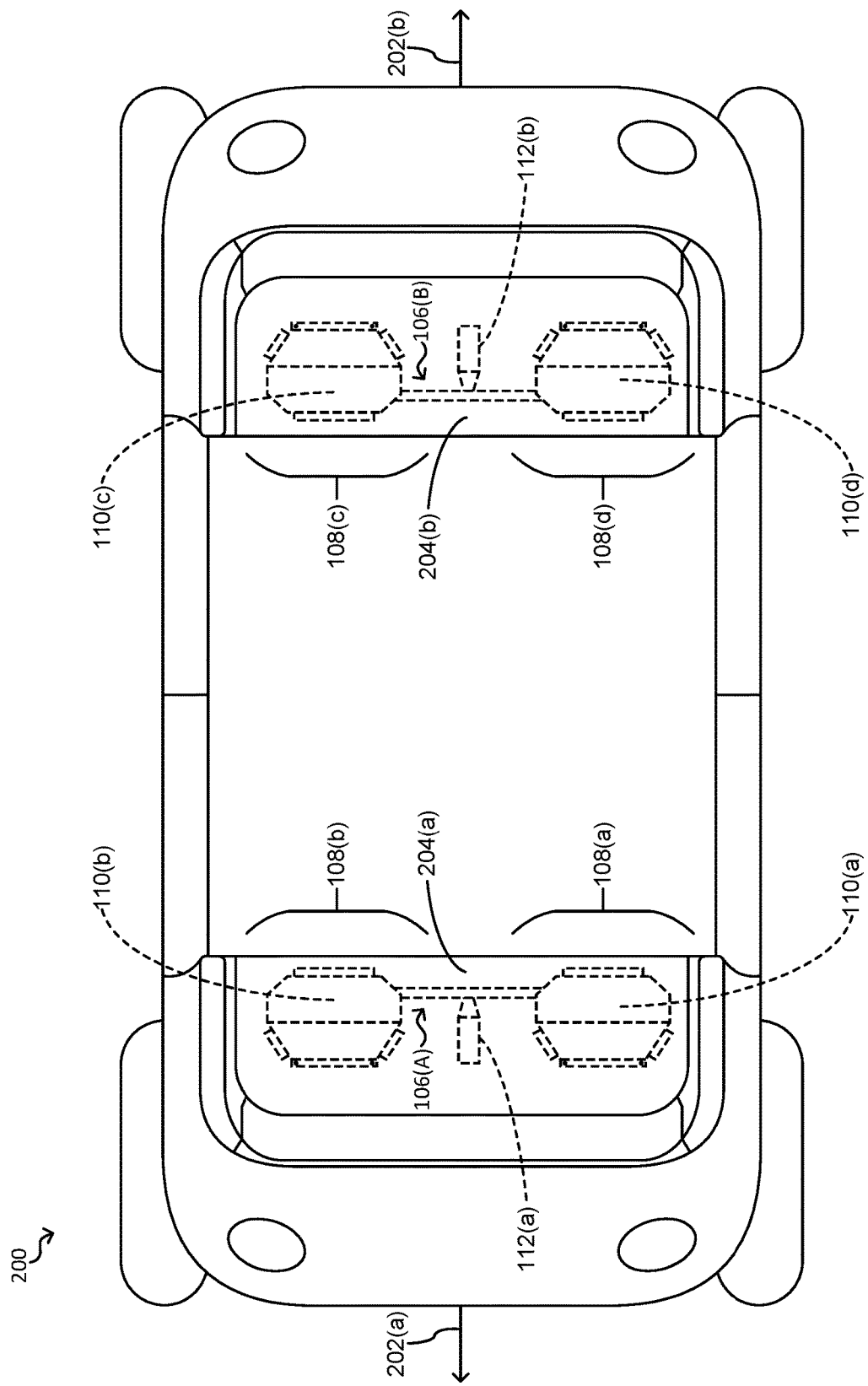
FIG. 2 illustrates a perspective view of an example vehicle with carriage seating which comprises an example restraint surface adjustment mechanism.

FIG. 2 illustrates a perspective view of an example bidirectional vehicle 200 with carriage seating and comprising a restraint surface adjustment system. In some examples, the bidirectional vehicle 200 may be a driverless vehicle capable of operating in a first forward direction 202(a) and in a second forward direction 202(b). As used herein, the terms "operate," "operates", or "operating" means to drive, cause to be driven, move, cause to move, steer, travel, or set in motion. The bidirectional vehicle 200 may comprise one or more bench-type seats for accommodating multiple occupants, such as bench seats 204(a) and 204(b). Bench seats 204(a) and 204(b) may be oriented in a carriage-style seating orientation, such as that shown in FIG. 2.

In some examples, bench seats 204(a) and 204(b) may each comprise a restraint surface adjustment system, such as restraint surface adjustment system 106(*a*) and restraint surface adjustment system 106(*b*). Additionally, each of restraint surface adjustment system 106(*a*) and restraint surface adjustment system 106(*b*) may comprise one or more inflatable bladders, such as inflatable bladders 110(*a*), 110(*b*), 110(*c*), and 110(*d*), and one or more inflators 112(*a*) and 112(*b*). Additionally, or alternatively, bench seats 204(*a*) and 204(*b*) may comprise one or more individual seat spaces for accommodating an occupant, such as seat spaces 108(*a*), 108(*b*), 108(*c*), and 108(*d*). In further examples, bench seats 204(*a*) and 204(*b*) may comprise a seat bottom cushion, seat back cushion, seat tub, headrests, and/or seatbelts, in addition to other occupant safety-type mechanisms.

In some examples, restraint surface adjustment system 106(*a*) and restraint surface adjustment system 106(*b*) may actuate independently of one another in response to the bidirectional vehicle 200 detecting a forward-facing collision. For instance, if the bidirectional vehicle 200 detects a collision while operating in the first forward direction 202(*a*), restraint surface adjustment system 106(*b*) may actuate to inflate inflatable bladders 110(*c*) and 110(*d*) to adjust a restraint surface angle associated with bench seat 204(*b*) and/or seat spaces 108(*c*) and 108(*d*). If the bidirectional vehicle 200 detects a collision while operating in the second forward direction 202(*b*), restraint surface adjustment system 106(*a*) may actuate to inflate inflatable bladders 110(*a*) and 110(*b*) to adjust a restraint surface angle associated with bench seat 204(*a*) and/or seat spaces 108(*a*) and 108(*b*).

In further examples, inflatable bladders 110(*a*), 110(*b*), 110(*c*), and 110(*d*) may inflate independently of one another in response to the bidirectional vehicle 200 detecting a forward-facing collision. For example, if the bidirectional vehicle 200 detects a collision while operating in the first forward direction 202(*a*), restraint surface adjustment system 106(*b*) may actuate to inflate inflatable bladders 110(*c*) and 110(*d*) to adjust a restraint surface angle of seat spaces 108(*c*) and 108(*d*). However, if the bidirectional vehicle detects that no occupant is seated in seat space 108(*c*), or if the occupant seated in seat space 108(*c*) weighs less than a threshold body weight, then restraint surface adjustment system 106(*b*) may determine to inflate only inflatable bladder 110(*d*).

Figure 3A:
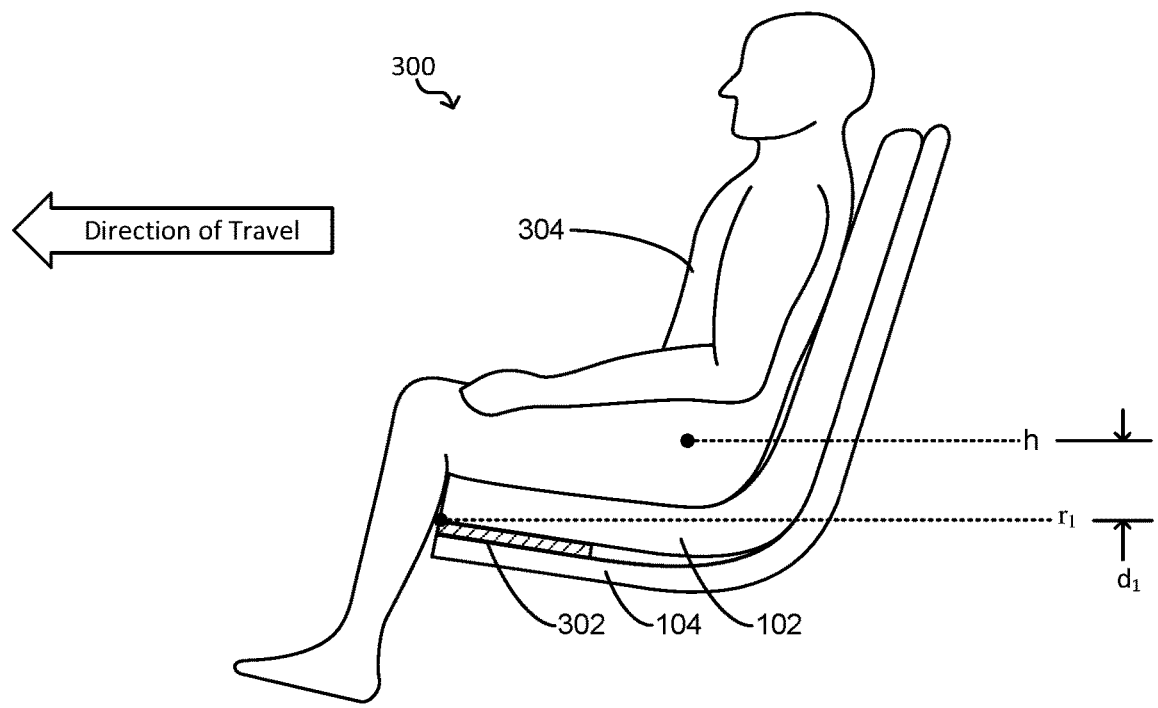
FIG. 3A illustrates a cross-section view of an example vehicle seat comprising a restraint surface adjustment mechanism comprising an inflatable bladder in a deflated state.

FIG. 3A illustrates an example cross-section view of a vehicle seat 300 facing in the direction of travel and comprising an inflatable bladder 302 in a deflated state. In some examples, the vehicle seat 300 may comprise a bench-type seat, similar to seat 100 of exemplary FIG. 1 and/or bench seats 204(*a*) or 204(*b*) of exemplary FIG. 2. In some examples, the vehicle seat 300 may comprise a seat cushion 102, a seat tub 104, and/or the inflatable bladder 302. The vehicle seat 300 may accommodate one or more occupants, such as occupant 304.

In some examples, seat tub 104 may be disposed under the seat cushion 102. In some examples, the inflatable bladder 302 may be disposed between the seat tub 104 and the seat cushion 102. Alternatively, in other examples, the inflatable bladder 302 may be disposed under seat tub 104.

In some examples, an occupant 304 seated in the vehicle seat 300 comprising the inflatable bladder 302 in the deflated state may have a hip position or "h-point" located at position h when seated. In some examples, the seat cushion 102 and/or the restraint surface adjustment mechanism may be configured for an h-point of a particular occupant size or range of occupant sizes (e.g., $5^{th}$ percentile woman, $50^{th}$ percentile man, $5^{th}$ percentile woman to $50^{th}$ percentile man, etc.). Additionally, a front portion of the inflatable bladder 302 of vehicle seat 300 may have a first height $r_1$ when the inflatable bladder 302 is in the deflated state. The two points h and $r_1$ may have an associated vertical distance $d_1$ between h and $r_1$ when the inflatable bladder 302 is deflated. As shown in exemplary FIG. 3A, when the inflatable bladder 302 is deflated, the height $r_1$ may be lower in relation to the h-point position h of occupant 304 by the vertical distance $d_1$.

Figure 3B:
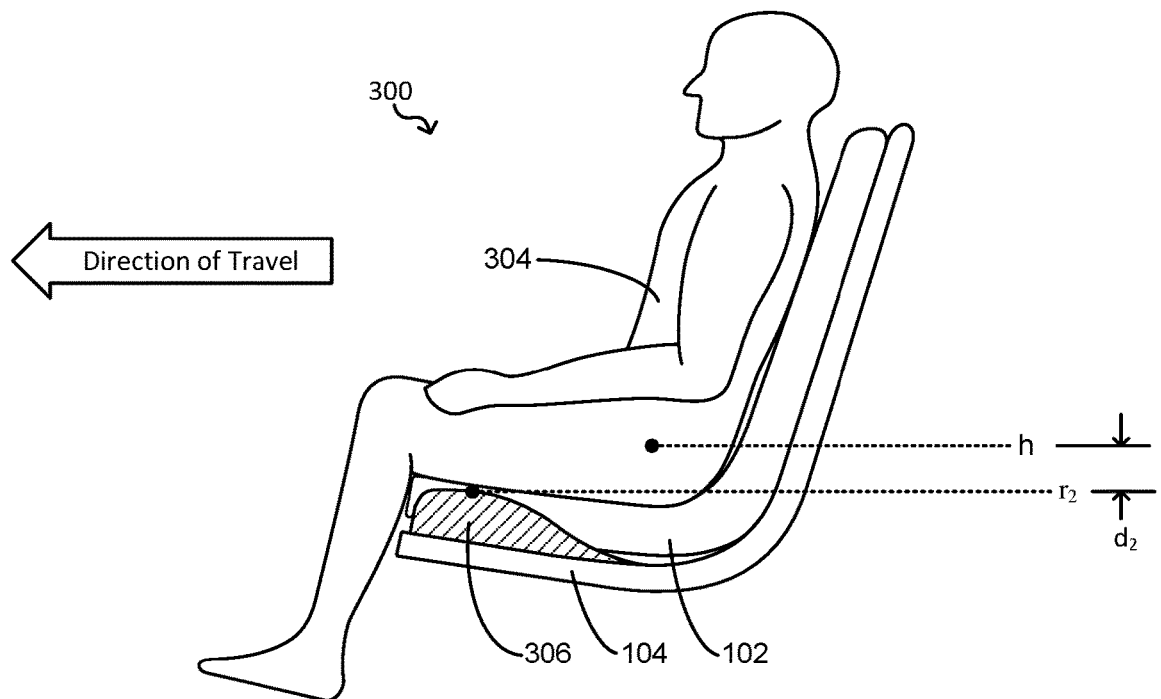
FIG. 3B illustrates a cross-section view of the example vehicle seat of FIG. 3A, with the restraint surface adjustment mechanism comprising the inflatable bladder in an inflated state.

FIG. 3B illustrates an example cross-section view of the vehicle seat 300 facing in the direction of travel and showing the inflatable bladder 302 in an inflated state. In some examples, the inflated bladder 306 may transition from the deflated state (shown in FIG. 3A) to the inflated state (shown in FIG. 3B) based at least in part on the vehicle detecting a collision (e.g., based on sensor data from a sensor such as an inertial measurement unit of the vehicle) or a predicted collision (e.g., by a prediction system of the vehicle). Additionally, or alternatively, the vehicle may determine whether to inflate the inflated bladder 306 based on whether the vehicle seat 300 is facing in the direction of travel of the vehicle.

In some examples, an occupant 304 seated in vehicle seat 300 when the inflated bladder 306 is inflated may have a hip position h when seated which is the same or similar to the hip position when the inflatable bladder 302 is deflated (as shown in FIG. 3A). However, when the inflated bladder 306 is inflated, the front portion of the inflated bladder 306 of vehicle seat 300 may have a second height $r_2$. Additionally, the two points h and $r_2$ may have an associated vertical distance $d_2$ between h and $r_2$ when the inflated bladder 306 is inflated. As shown in exemplary FIG. 3B, the inflated bladder 306 may cause a restraint surface angle of at least a portion of the inflated bladder 306 of the vehicle seat 300 to be steeper than when the inflatable bladder 302 is deflated (as shown in FIG. 3A). Thus, the second height $r_2$ of the front portion of the inflated bladder 306 may be lower in relation to the h-point position h of occupant 304 by a vertical distance $d_2$. The difference of the vertical distances $d_1$ and $d_2$ in this example may correspond to a range of travel of the restraint surface adjustment mechanism. In some examples, the range of travel of the restraint surface adjustment mechanism may be in the range of 30 mm to 150 mm. In other examples the range of travel of the restraint surface adjustment mechanism may be more or less than this range.

Figure 4A:
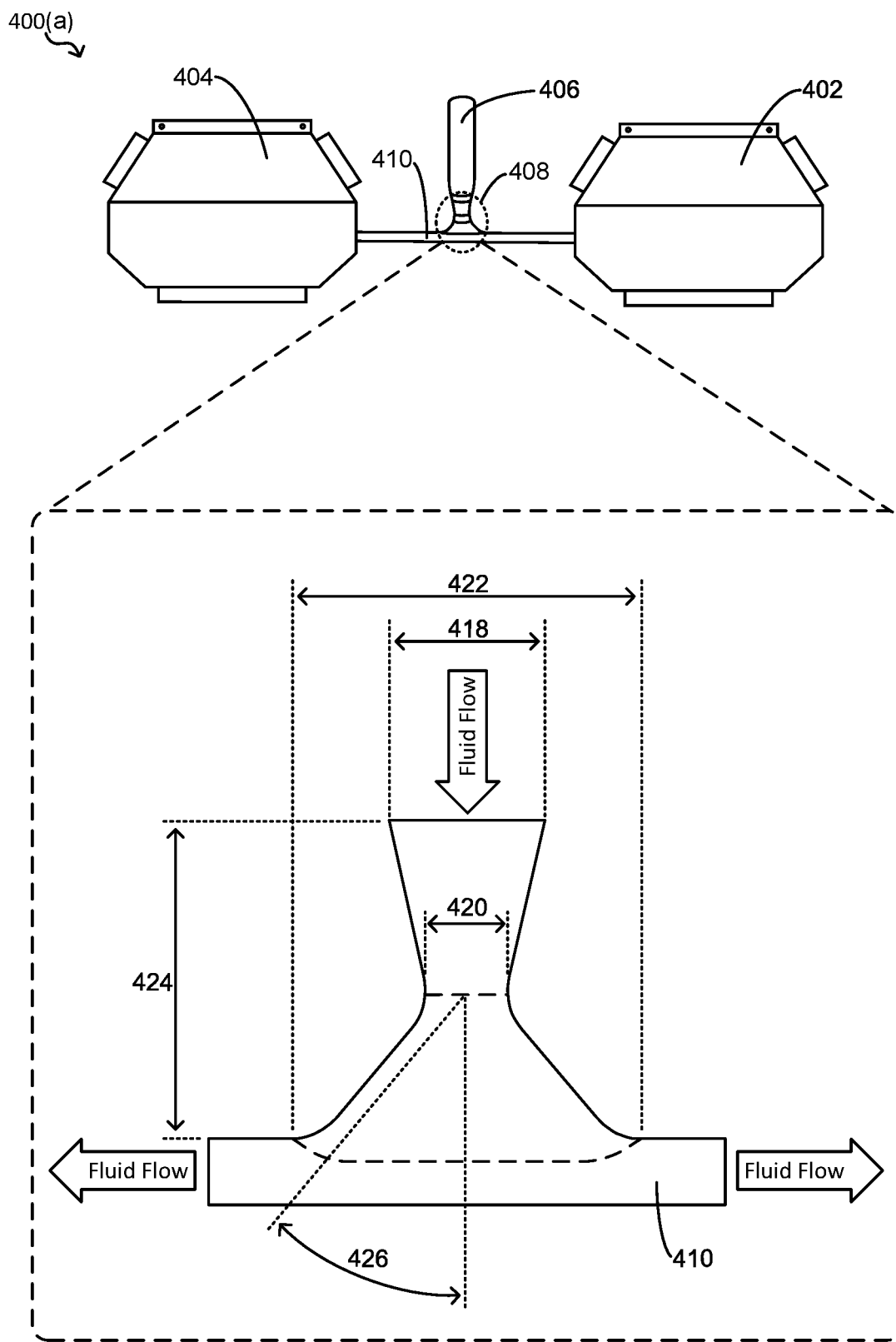
FIG. 4A illustrates detail of an example inflation system with a funnel-type manifold.

FIG. 4A illustrates example detail of an inflation system 400(*a*) for inflating one or more inflatable bladders, which may be the same as or different than the inflatable bladders 302. The inflation system 400(*a*) of this example includes a funnel-type manifold 408. The inflation system 400(*a*) may comprise a first inflatable bladder 402, a second inflatable bladder 404, an inflator 406, a funnel-type manifold 408, and a bladder inflation tube 410.

In some examples, the inflator 406 may be in fluid communication with the first inflatable bladder 402 and/or the second inflatable bladder 404 via the funnel-type manifold 408 and the bladder inflation tube 410. In some examples, the inflator 406 may inflate the first inflatable bladder 402 and the second inflatable bladder 404 at substantially the same time and/or rate. Additionally, the funnel-type manifold 408 may be disposed along the bladder inflation tube 410 at a distance approximately halfway between the first inflatable bladder 402 and the second inflatable bladder 404.

In some examples, the funnel-type manifold 408 may comprise a first funnel and a second funnel, the first funnel attached to the inflator 406, the first funnel attached to the second funnel, and the second funnel attached to the bladder-inflation tube 410. In some examples, and as described in further detail below, the second funnel may comprise an oval or oblong shape to create a smooth transition surface for fluid and/or gas to flow through the second funnel and into the bladder inflation tube 410. In this way, the shape of the funnel-type manifold 408 may allow fluid to evenly flow through the manifold and into the bladder inflation tube 410 in opposite directions and at substantially equal rates such that the first inflatable bladder 402 and the second inflatable bladder 404 may be inflated at substantially the same time and/or rate.

As shown in exemplary FIG. 4A, in some examples the first funnel of the funnel-type manifold 408 may comprise an inlet orifice diameter 418 of, for example, 20 mm to 50 mm in diameter. Additionally, an outlet orifice of the first funnel may be coupled to an inlet orifice of the second funnel, and the manifold may further comprise a coupled orifice diameter 420 of, for example, 10 mm to 30 mm in diameter. Additionally, in some examples the second funnel may comprise an oval and/or oblong shaped outlet orifice that is coupled to bladder inflation tube 410. In some examples, the oval and/or oblong shaped outlet orifice of the second funnel may comprise an outlet orifice width 422 of, for example, 65 mm to 105 mm wide. Additionally, in some examples, the first funnel and the second funnel, when coupled together to form funnel-type manifold 408, may comprise a manifold length 424 of, for example, 55 mm to 95 mm in length. Additionally, in some examples the second funnel of funnel-type manifold 408 may comprise a fluid transition angle 426 such that, when fluid flows through the manifold, the fluid equally flows into the first inflatable bladder 402 and the second inflatable bladder 404 via the bladder inflation tube 410 to inflate each bladder at substantially the same and/or equal rates. In some examples, the fluid transition angle 426 may range, for example, from 30 degrees to 60 degrees. However, in other examples, funnel-type manifolds according to this disclosure may have dimensions and/or angles smaller or larger than the examples described herein.

Figure 4B:
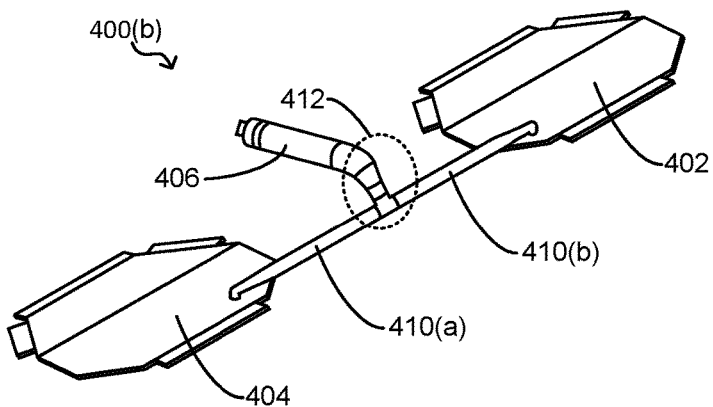
FIG. 4B illustrates detail of an example inflation system with an angled manifold.

FIG. 4B illustrates example detail of an inflation system 400(b) with an angled manifold. The inflation system 400(b) may comprise a first inflatable bladder 402, a second inflatable bladder 404, an inflator 406, an angled manifold 412, and a first bladder inflation tube 410(a) and a second bladder inflation tube 410(b). In some examples, the angled manifold 412 may be usable to position the inflation system 400(b) in a seat of a vehicle, while avoiding contact between the inflator 406 and other vehicle structure. While the angled manifold 412 in this example is shown to position the inflator 406 at a higher elevation than the first inflatable bladder 402 and second inflatable bladder 404, in other examples the angled manifold 412 may be inverted so as to position the inflator 406 at a lower elevation than first the inflatable bladder 402 and second inflatable bladder 404.

In some examples, the angled manifold 412 may further comprise a funnel-type shape, similar to that of funnel-type manifold 408. In additional or alternative examples, angled manifold 412 may comprise a first funnel and a "T" fitting, the first funnel connected to the inflator 406 and to the T fitting. Additionally, the T fitting may comprise a first orifice, a second orifice, and a third orifice, the first orifice connected to the angled manifold 412, the second orifice connected to the first bladder inflation tube 410(a), and the third orifice connected to the second bladder inflation tube 410(b).

Figure 4C:
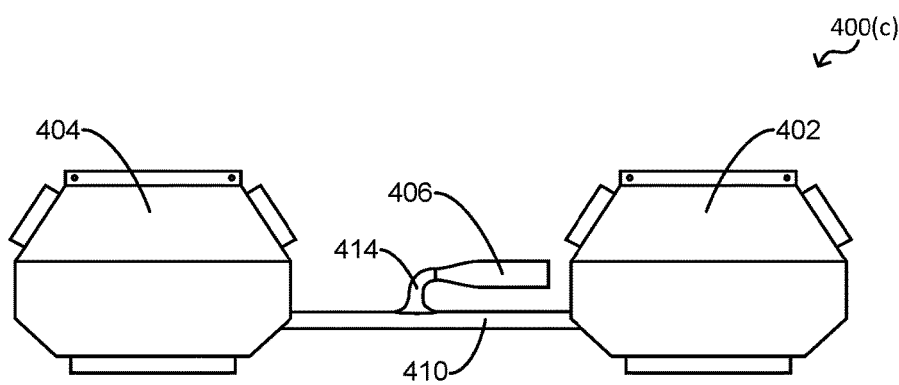
FIG. 4C illustrates detail of an example inflation system with a bent manifold.

FIG. 4C illustrates example detail of an inflation system 400(c) with a bent manifold. The inflation system 400(c) may comprise a first inflatable bladder 402, a second inflatable bladder 404, an inflator 406, a bent manifold 414, and a bladder inflation tube 410. In some examples, the bent manifold 414 may be usable to position the inflation system 400(c) in a seat of a vehicle, while avoiding contact between the inflator 406 and other structure of the vehicle.

In some examples, the bent manifold 414 may position the inflator 406 at various angles. For instance, the bent manifold 414 may position the inflator 406 such that it is oriented in a parallel direction with the bladder inflation tube 410 as shown. In other instances, the bent manifold 414 may position the inflator 406 such that it is oriented in a downward facing direction (e.g., toward the ground) through the seat tub bottom or in any other angle relative to the bladder inflation tube 410.

In some examples, the bent manifold 414 may comprise a funnel-type shape similar to that of funnel-type manifold 408. For instance, the outlet orifice of the bent manifold 414 may comprise an oval or oblong shape connected to bladder inflation tube 410. The oval or oblong shape of the outlet may reduce down to a smaller oval or circle at its connection with the bladder inflation tube 410. In this way, fluid and/or gas can flow from the manifold and into the first inflatable bladder 402 and the second inflatable bladder 404 at substantially the same time and/or rate.

Figure 4D:
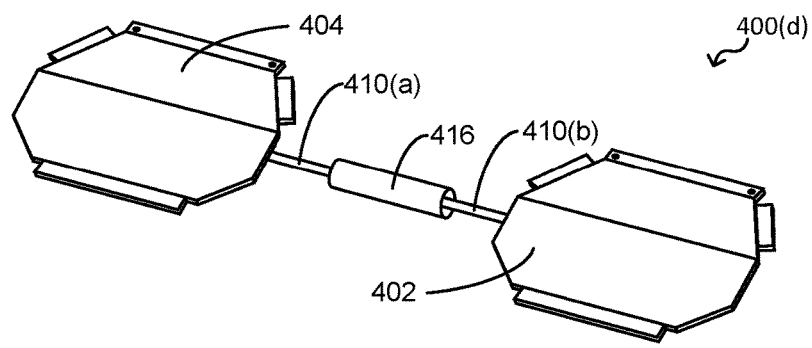
FIG. 4D illustrates detail of an example inline inflation system.

FIG. 4D illustrates example detail of an inline-inflation system 400(d). The inflation system 400(d) may comprise a first inflatable bladder 402, a second inflatable bladder 404, an inline-inflator 416, and first and second bladder inflation tubes 410(a) and 410(b). In some examples, the inline-inflator 416, when actuated, causes gas and/or fluid to flow from both ends of the inline-inflator 416 and into each of the first and second bladder inflation tubes 410(a) and 410(b), thereby inflating the first inflatable bladder 402 and the second inflatable bladder 404 at substantially the same time and/or rate. However, in other examples, the inline-inflator 416 may inflate only one of the first inflatable bladder 402 or the second inflatable bladder 404 (e.g., by provision of a valve not shown). In further examples, the inline-inflator 416 may inflate the first inflatable bladder 402 before inflating the second inflatable bladder 404 or vice versa.

In some examples, the inline-inflator 416 may be disposed halfway or approximately halfway between the first inflatable bladder 402 and the second inflatable bladder 404. Additionally, or alternatively, the inline-inflator 416 may comprise a first outlet and a second outlet. In some examples, the first outlet may be connected to the first bladder inflation tube 410(a) and in fluid communication with the first inflatable bladder 402. Additionally, the second outlet may be connected to the second bladder inflation tube 410(b) and in fluid communication with the second inflatable bladder 404.

Figure 5A:
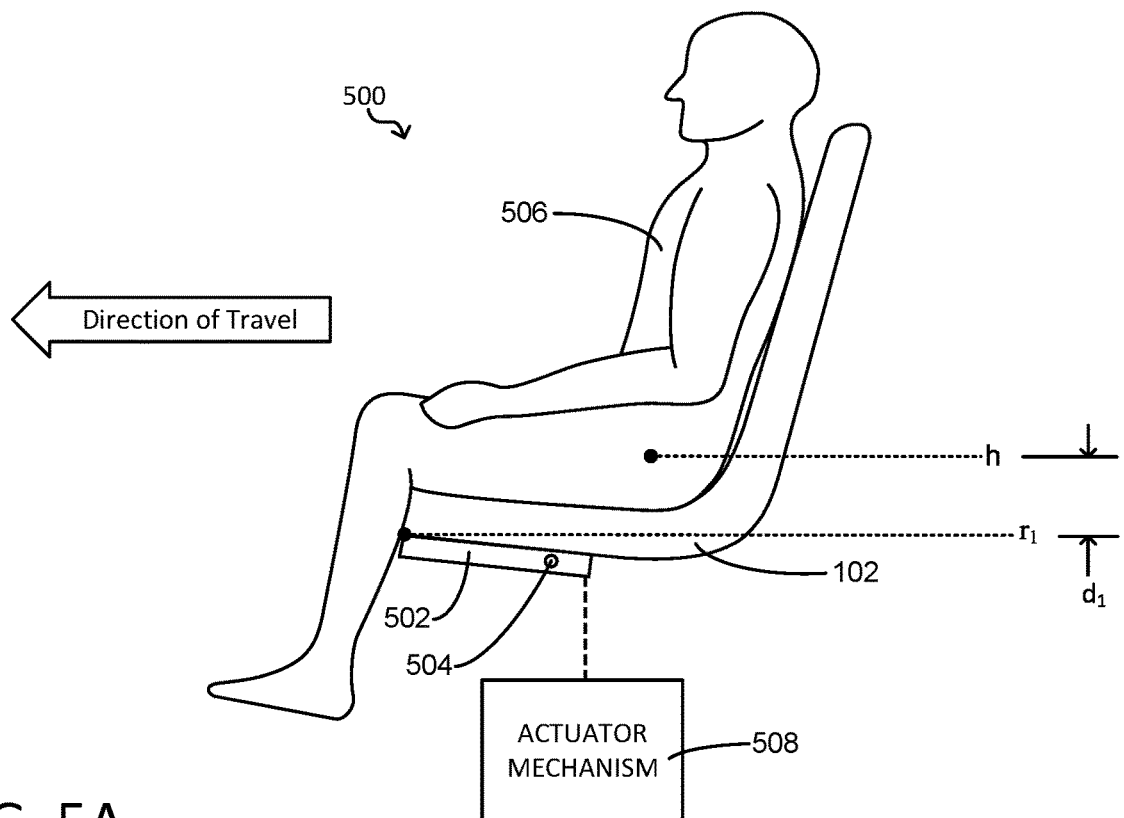
FIG. 5A illustrates a cross-section view of an example vehicle seat comprising an example restraint surface adjustment mechanism in a non-actuated state.

FIG. 5A illustrates an example cross-section view of a vehicle seat 500 comprising a restraint surface adjustment mechanism in a non-actuated state. In some examples, the restraint surface adjustment mechanism may comprise a restraint surface adjusting plate 502 and a hinge pin 504. The restraint surface adjusting plate 502 may pivot about the hinge pin 504 when force is applied to a first end of the restraint surface adjusting plate 502 to elevate a second, opposite, end of the restraint surface adjusting plate 502 proximate a front of the seating surface, thereby elevating or increasing a slope of a restraint surface angle under at least a portion of the seat cushion 102 to restrain an occupant 506 during a collision.

In some examples, the restraint surface adjustment mechanism of vehicle seat 500 may comprise an actuator mechanism 508. In some examples, the actuator mechanism 508 may comprise a spring, a hydraulic cylinder, a pneumatic cylinder, a motor, an electro-magnet, a pyrotechnic mechanism, or a combination of these or other mechanisms. The actuator mechanism 508 may also include, or be coupled to, the restraint surface adjusting plate 502 by, one or more gears, linkages, shafts, belts, chains, or other couplings to move the restraint surface adjusting plate 502 between the non-actuated position (shown in FIG. 5A) and the actuated position (shown in FIG. 5B). In some examples, the actuator mechanism 508 may be connected to the restraint surface adjusting plate 502. For instance, if the actuator mechanism 508 comprises a spring, the spring may be connected directly to the restraint surface adjusting plate 502 to adjust a restraint surface angle of the seat. However, in other examples, such as when the actuator mechanism 508 comprises an electro-magnet, the electro-magnet or other mechanism may be spaced from and may not be connected directly to the restraint surface adjusting plate 502.

In some examples, the occupant 506 seated in vehicle seat 500 comprising the restraint surface adjusting plate 502 in the non-actuated state may have a hip position or "h-point" located at position h when seated. In some examples, the seat cushion 102 and/or the restraint surface adjusting plate 502 may be configured for an h-point of a particular occupant size or range of occupant sizes (e.g., $5^{th}$ percentile woman, $50^{th}$ percentile man, $5^{th}$ percentile woman to $50^{th}$ percentile man, etc.). Additionally, a top portion of restraint surface adjusting plate 502 of vehicle seat 500 may have a first height $r_1$ when the restraint surface adjusting plate 502 is in the non-actuated state. As shown in exemplary FIG. 5A, the first height $r_1$ may be lower in relation to h-point position h of occupant 304 when restraint surface adjusting plate 502 is in a non-actuated state. Further, the two points h and $r_1$ may have an associated vertical distance $d_1$ between h and $r_1$ when the restraint surface adjusting plate 502 is in the non-actuated state.

Figure 5B:
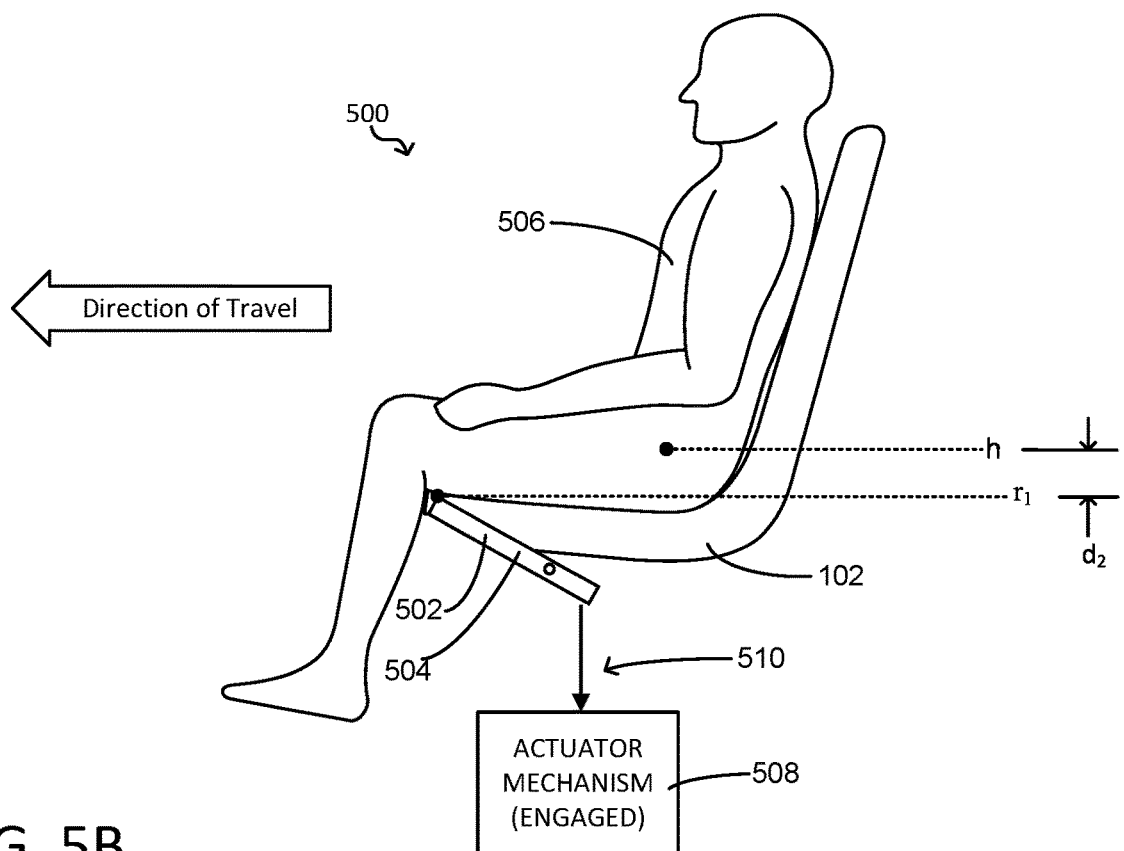
FIG. 5B illustrates a cross-section view of an example vehicle seat comprising the example restraint surface adjustment mechanism of FIG. 5A in an actuated state.

FIG. 5B illustrates an example cross-section view of the vehicle seat 500 comprising the restraint surface adjusting plate 502 in an actuated state. As shown in FIG. 5B, the restraint surface adjusting plate 502 has been rotated clockwise about an axis created by hinge pin 504 to elevate a front edge of the restraint surface adjusting plate 502, thereby elevating a restraint surface angle associated with vehicle seat 500.

In some examples, the actuator mechanism 508 may be actuated by an occupant protection system or other system of a vehicle based at least in part on detection of a collision or predicted collision. The actuator mechanism 508 can apply a force 510 to a portion of the restraint surface adjusting plate 502. For instance, if the actuator mechanism 508 comprises a spring, then the spring may exert a downward force on at least a portion of the restraint surface adjusting plate 502, such that the restraint surface adjusting plate 502 rotates about an axis created by hinge pin 504 to elevate a front edge of the restraint surface adjusting plate 502, thereby elevating and/or increasing a slope of a restraint surface angle associated with vehicle seat 500. In some examples, the vehicle may determine that the vehicle seat 500 is facing in the direction of travel of the vehicle and may determine to engage the actuator mechanism 508 based at least in part on the determination that the vehicle seat 500 is facing in the direction of travel of the vehicle.

In some examples, hinge pin 504 may comprise a self-locking mechanism to hold a restraint surface constant after actuating the restraint surface adjusting plate 502. For instance, when a force is exerted downward on restraint surface adjusting plate 502 to adjust the restraint surface, hinge pin 504 may lock restraint surface adjusting plate 502 in place to maintain the adjusted height and/or angle of the restraint surface.

In some examples, the occupant 506 seated in vehicle seat 500 comprising a restraint surface adjusting plate 502 in an actuated position may have a hip position h when seated. However, when the restraint surface adjusting plate 502 is in the actuated state, a front edge of the restraint surface adjusting plate 502 disposed under vehicle seat 500 may have a second restraint surface height $r_2$. As shown in exemplary FIG. 5B, a restraint surface adjusting plate 502 in an actuated state may cause an angle of the restraint surface to be increased, thereby causing the second restraint surface height $r_2$ to be lower in relation to the h-point position h of the occupant 506 by a vertical distance $d_2$, but higher in relation to the first vertical distance $d_1$ when the restraint surface adjusting plate 502 was in the non-actuated state. Additionally, the difference of vertical distances $d_1$ and $d_2$ may correspond to a range of travel associated with the restraint surface adjusting plate 502. In some examples, the range of travel of the restraint surface adjustment mechanism may be in the range of 30 mm to 150 mm. In other examples the range of travel of the restraint surface adjustment mechanism may be greater or less than this range this range.

Figure 5C:
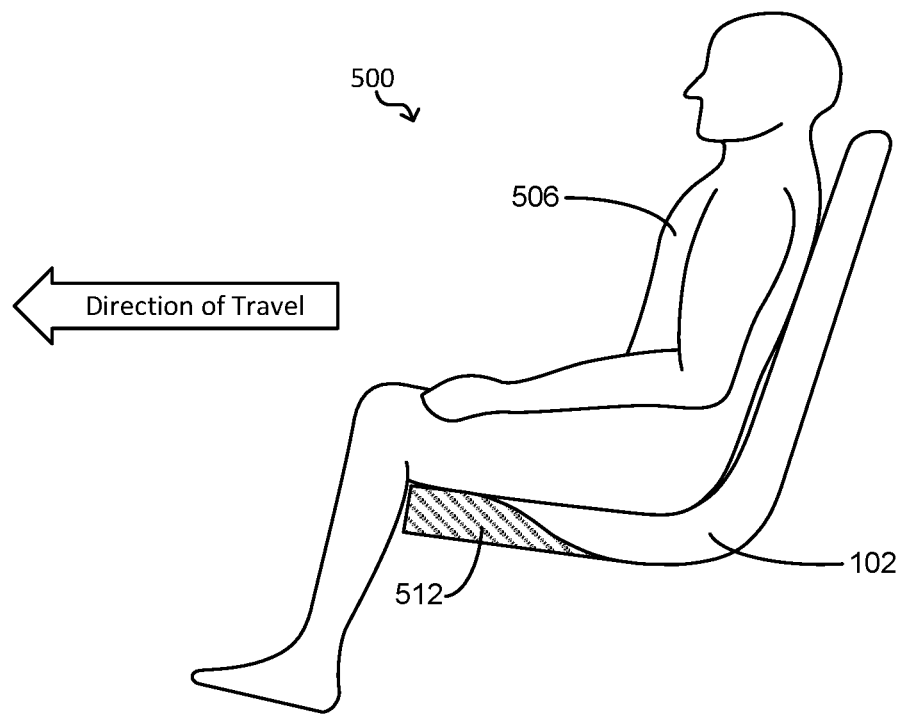
FIG. 5C illustrates a cross-section view of an example vehicle seat comprising another example restraint surface adjustment mechanism in a non-actuated state.

FIG. 5C illustrates a cross-section view of an example vehicle seat 500 comprising a restraint surface adjustment mechanism 512 in a non-actuated state. As shown in FIG. 5C, in some examples the seat cushion 102 and/or the restraint surface adjustment mechanism 512 may comprise an adjustable material configured to change material property responsive to application of one or more stimuli (e.g., an electric field, magnetic field, heat, etc.). By way of example and not limitation, adjustable materials may include a shape memory material (SMM), shape-memory alloy, shape-memory polymer, electroactive polymer, magnetostrictive material, magnetic shape memory alloy, dielectric elastomer, or any other material that changes size, shape, rigidity, elasticity, and/or other physical properties responsive to one or more stimuli. In some examples, when the adjustable material of the restraint surface adjustment mechanism 512 is in a first state (inactive state), such as the example illustrated in FIG. 5C, the restraint surface adjustment mechanism 512 and the adjustable material may have a first physical property (e.g., size, shape, rigidity, and/or elasticity). For instance, the first physical property may comprise a first rigidity at which the adjustable material is relatively easily compressed or deformed. In this way, in the inactive state the restraint surface adjustment mechanism 512 may maintain occupant comfort as a seat cushion 102 during normal operation.

Figure 5D:
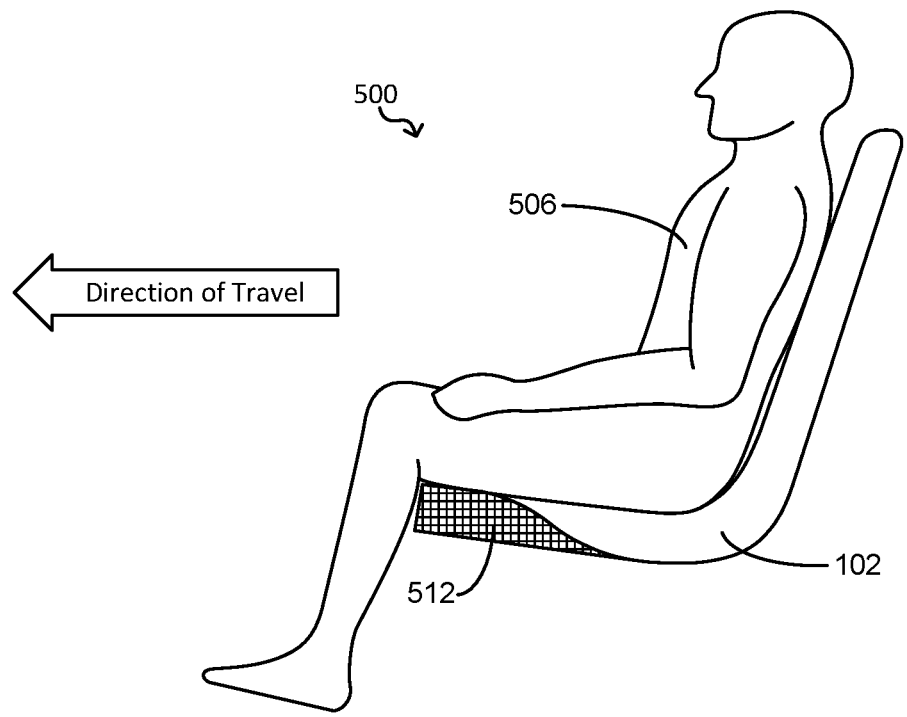
FIG. 5D illustrates a cross-section view of an example vehicle seat comprising the example restraint surface adjustment mechanism of FIG. 5C in an actuated state.

FIG. 5D illustrates a cross-section view of the example vehicle seat comprising the restraint surface adjustment mechanism 512 in an actuated state. As shown in exemplary FIG. 5D, when the adjustable material is subjected to a stimulus, restraint surface adjustment mechanism 512 may transition to a second state (an activated state) having a second physical property (e.g., size, shape, rigidity, and/or elasticity) that is different than the first physical property. For instance, the second physical property may be a rigidity that is greater than the first rigidity in order to more firmly restrain or couple the pelvis of the occupant 506 during a collision or predicted collision. In some examples, the adjustable material of the seat cushion 102 and/or restraint surface adjustment mechanism may be activated by a stimulus, such as application of an electric field, to create a relatively rigid surface in response to detecting a collision, predicted collision, or one or more operations of the vehicle, such as braking, accelerating, and/or cornering. Because the stimulus, which actuates the adjustable material to change physical property, may easily be removed, the restraint surface adjustment mechanism may be activated and deactivated multiple times over the lifespan of the vehicle seat.

Figure 6:
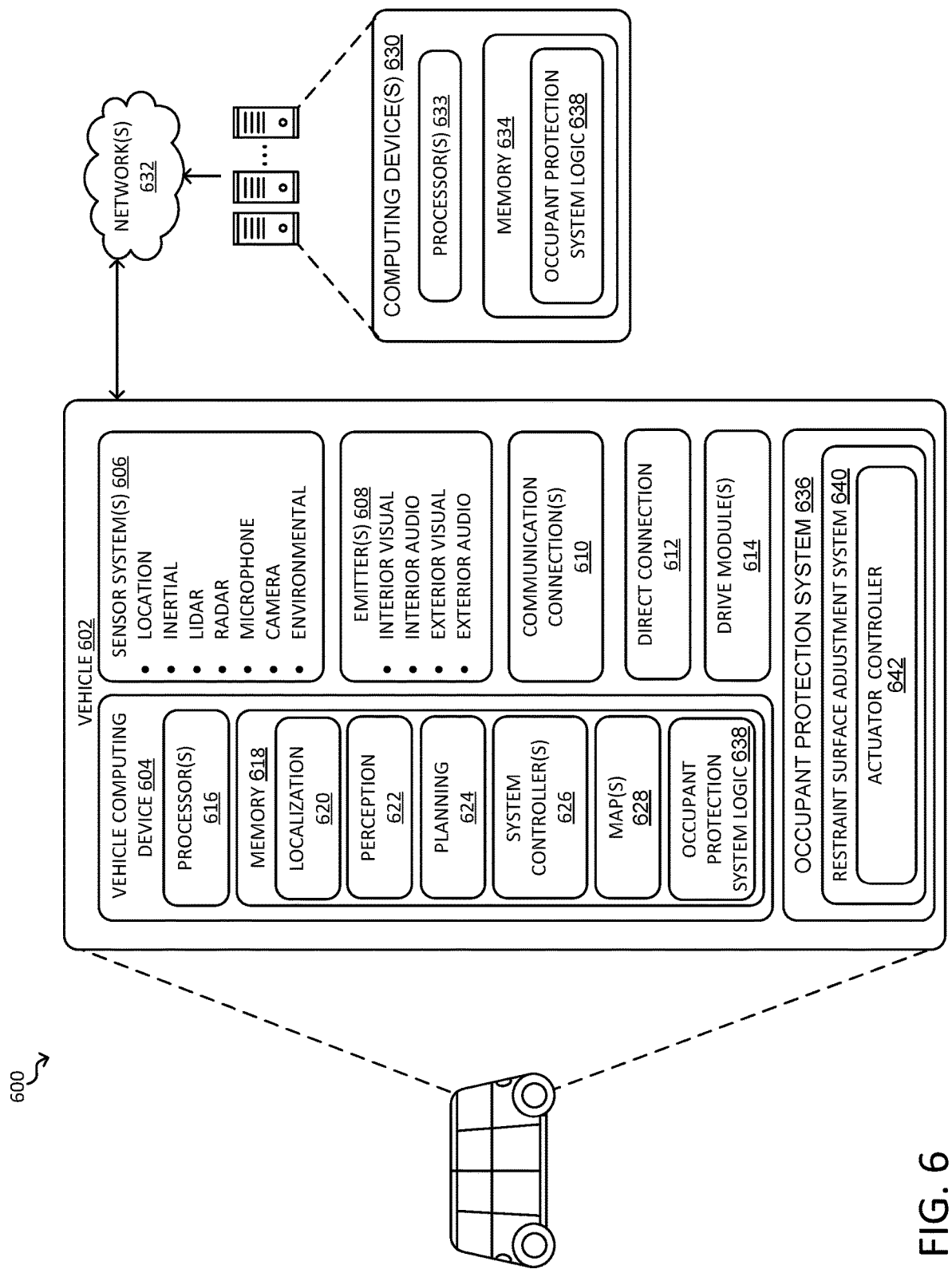
FIG. 6 is a block diagram illustrating an example system for implementing the techniques described herein.

FIG. 6 is a block diagram illustrating an example system 600 for implementing the techniques described herein. In some examples, the system 600 may include a vehicle 602, which may correspond to the example bidirectional vehicle 200 shown in FIG. 2. The vehicle 602 may include a vehicle computing device 604, one or more sensor systems 606, one or more emitters 608, one or more communication connections 610, at least one direct connection 612, one or more drive modules 614, and an occupant protection system 636.

The vehicle computing device 604 may include one or more processors 616 and memory 618 communicatively coupled with the one or more processors 616. In the illustrated example, the vehicle 602 is an autonomous vehicle. However, the vehicle 602 may be any other type of vehicle. In the illustrated example, the memory 618 of the vehicle computing device 604 stores a localization component 620, a perception component 622, a planning component 624, one or more system controllers 626, one or more map(s) 628, and occupant protection system logic 638. Though depicted in FIG. 6 as residing in memory 618 for illustrative purposes, it is contemplated that the localization component 620, the perception component 622, the planning component 624, the one or more system controllers 626, the one or more maps 628, and the occupant protection system logic 638 may additionally, or alternatively, be accessible to the vehicle 602 (e.g., stored on, or otherwise accessible by, memory remote from the vehicle 202).

In some examples, the localization component 620 may be configured to receive data from the sensor system(s) 606 to determine a position and/or orientation of the vehicle 602 (e.g., one or more of an x-, y-, z-position, roll, pitch, or yaw). For instance, the localization component 620 may include and/or request/receive a map of an environment and may continuously determine a location and/or orientation of the autonomous vehicle within the map. In some examples, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 620 may provide data to various components of the vehicle 602 to determine an initial position of an autonomous vehicle for generating a candidate trajectory, as discussed herein.

In some examples, the perception component 622 may be configured to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). Additionally, or alternatively, the perception component 622 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In some examples, the planning component 624 may determine a path for the vehicle 602 to follow to traverse through an environment. For instance, the planning component 624 may determine various routes and trajectories and various levels of detail. Additionally, or alternatively, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In some examples, the planning component 624 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In some examples, the planning component 624 may determine a location of a user based on image data of an environment received from the user using, for example, bags of binary words with image-based features, artificial neural network, and the like. Further, the planning component 624 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In some examples, the planning component 624 may determine a pickup location based at least in part on determining a user identity (e.g., determined via image recognition or received as an indication from a user device, as discussed herein).

In some examples, the planning component 624 may include a prediction system that predicts the trajectories of one or more other objects in the environment of the vehicle 602. In the event that a predicted trajectory of an object in the environment intersects with a planned trajectory of the vehicle 602 and the vehicle is unable to avoid the predicted trajectory of the object, the prediction system may determine that a predicted collision condition exists. In other examples, the prediction system may be a part of a different system of the vehicle or may be a separate standalone system.

In some examples, the vehicle computing device 604 may include one or more system controllers 626, which may be configured to control steering, propulsion, braking, safety, emitters, communication, and other systems of the vehicle 602. These system controller(s) 626 may communicate with and/or control corresponding systems of the drive module(s) 614 and/or other components of the vehicle 602.

In some examples, the memory 618 may further include one or more map(s) 628 that may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In some examples, the one or more maps 628 may include at least one map (e.g., images and/or a mesh). In some examples, the vehicle 602 may be controlled based at least in part on the maps 628. That is, the maps 628 may be used in connection with the localization component 620, the perception component 622, and/or the planning component 624 to determine a location of the vehicle 602, identify objects in an environment, and/or generate routes and/or trajectories to navigate within an environment.

In some examples, the one or more map(s) 628 may be stored on a remote computing device(s) (such as computing device(s) 630) accessible via one or more network(s) 632. In some examples, multiple maps 628 may be stored based on, for example, a characteristic (e.g., type of entity, time of day, day of week, season of the year, etc.). Storing multiple maps 628 may have similar memory requirements but increase the speed at which data in a map may be accessed. As shown in FIG. 6, in some examples, the memory 618 may further include occupant protection system logic 638 that may be used by the vehicle 602 and/or the vehicle computing device 604 to control the occupant protection system 636. In some examples, the occupant protection system logic 638 may be stored in the memory 618 of the computing device 604 of the vehicle 602 or remote from the vehicle 602 in the memory 634 of the computing device(s) 630. In some examples, some portions of the occupant protection system logic 638 may be stored in the memory 618 of the computing device 604 of the vehicle 602, and other portions of the occupant protection system logic 638 may be stored remotely in the memory 634 of the computing device(s) 630, and the separately located portions of the occupant protection system logic 638 may operate together in a coordinated manner.

In some examples, the occupant protection system logic 638 may determine whether to actuate the occupant protection system 636 based at least in part on occurrence of one or more conditions (e.g., detection of a collision or predicted collision). For instance, the one or more processors 616 of the vehicle computing device 604 and/or the one or more processors 633 of the remote computing device 630 may receive data from at least one sensor of the one or more sensor systems 606 of the vehicle 602. The one or more processors 616 of the vehicle computing device 604 and/or the one or more processors 633 of the remote computing device 630 may utilize the occupant protection system logic 638, or another component of the memory 618 and/or the memory 634, to determine whether the vehicle 602 has experienced a collision or is predicted to experience a collision (e.g., by a prediction system of the vehicle). Additionally, or alternatively, the one or more processors may determine, based at least in part on the occupant protection system logic 638, whether to send instructions to at least one of the actuator controller 642, the restraint surface adjustment system 640, and/or the occupant protection system 636 to perform one or more functions.

In some examples, aspects of some or all of the components discussed herein may include any models, algorithms, and/or machine learning algorithms. For instance, the components in the memory 618 and/or the memory 634 may be implemented at least partially as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For instance, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In some examples, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 606 may include multiple examples of each of these or other types of sensors. For instance, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The cameras may be coupled to the perception component 622 to detect and/or classify objects such as occupants of the vehicle. In some examples, the perception component 622 may be configured to determine a size, age, and/or weight of an occupant, and/or to detect objects such as child seats. Additionally or alternatively, the sensor system(s) 606 may include weight sensors, pressure sensors, occupant detection sensors, child seat detection sensors, inflator status sensors, actuator sensors, and combinations of these or other types of sensors which may be disposed in, on, or in association with the one or more seats of the vehicle and/or at other locations in an interior of the vehicle. The sensor system(s) 606 may provide input to the vehicle computing device 604. Additionally, or alternatively, the sensor system(s) 606 may send sensor data, via the one or more networks 632, to the one or more computing device(s) 630 at a particular frequency, after a lapse of a predetermined period of time, in near real-time, etc.

In some examples, the vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 602 may also include one or more communication connection(s) 610 that enable communication between the vehicle 602 and one or more other local or remote computing device(s). For example, the communication connection(s) 610 may facilitate communication with other local computing device(s) on the vehicle 602 and/or the drive module(s) 614. Also, the communication connection(s) 610 may allow the vehicle 602 to communicate with other nearby computing device(s) (e.g., other nearby vehicles, traffic signals, etc.). The communications connection(s) 610 also enable the vehicle 602 to communicate with a remote teleoperation computing device or other remote services.

The communications connection(s) 610 may include physical and/or logical interfaces for connecting the vehicle computing device 604 to another computing device or a network, such as network(s) 632. For example, the communications connection(s) 610 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In some examples, the vehicle 602 may include one or more drive modules 614. In some examples, the vehicle 602 may have a single drive module 614. In at least one example, if the vehicle 602 has multiple drive modules 614, individual drive modules 614 may be positioned on opposite ends of the vehicle 602 (e.g., the leading end and the rear, etc.). In at least one example, the drive module(s) 614 may include one or more sensor systems to detect conditions of the drive module(s) 614 and/or the surroundings of the vehicle 602. By way of example and not limitation, the sensor system(s) 606 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The drive module(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller, which may receive and preprocess data from the sensor system(s) 606 and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 also include one or more communication connection(s) that enable communication by the respective drive module with one or more other local or remote computing device(s).

In at least one example, the direct connection 612 may provide a physical interface to couple the one or more drive module(s) 614 with the body of the vehicle 602. For example, the direct connection 612 may allow the transfer of energy, fluids, air, data, etc. between the drive module(s) 614 and the vehicle 602. In some examples, the direct connection 612 may further releasably secure the drive module(s) 614 to the body of the vehicle 602.

In at least one example, the localization component 620, perception component 622, the planning component 624, and/or the occupant protection system logic 638 may process sensor data, as described above, and may send their respective outputs, over the one or more network(s) 632, to one or more computing device(s) 630. In at least one example, the localization component 620, the perception component 622, the planning component 624, and/or the occupant protection system logic 638 may send their respective outputs to the one or more computing device(s) 630 at a particular frequency, after a lapse of a predetermined period of time, in near real-time, etc.

The processor(s) 616 of the vehicle 602 and/or the processor(s) 633 of the computing device(s) 630 may include any suitable processor capable of executing instructions to process data and perform operations as described herein. By way of example and not limitation, the processor(s) 616 and 633 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 634 are examples of non-transitory computer-readable media. The memory 618 and 634 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, the vehicle 602 may also comprise the occupant protection system 636. In some examples, the occupant protection system 636 may include and/or have access to both hardware and software components of vehicle 602 including, as an example, access to the one or more sensor system(s) 606 described above in order to detect a presence of an occupant, presence of a child seat, an occupant's weight, etc. In some examples, the occupant protection system 636 may include the restraint surface adjustment system 640, which may include actuator controller 642. Additionally, or alternatively, the occupant protection system 636 may include one or more seatbelt restraints, such as a lap and/or shoulder belt, and one or more front and/or side airbag restraints. In some examples, as depicted in FIG. 6, the occupant protection system 636 may be implemented as a separate system. However, in other examples, portions of the occupant protection system 636, such as control logic (e.g., occupant protection system logic 638) may be stored in memory 618 of the vehicle computing device 604 and/or memory 634 of the remote computing device 630. In some examples, the occupant protection system 636 and/or the restraint surface adjustment system 640 may be associated with one or more of the vehicle computing device 604 on board the vehicle 602 or the remote computing device(s) 630. In this way, at least one of the occupant protection system 636 and/or the restraint surface adjustment system 640 may access the occupant protection system logic 638.

In some examples, the restraint surface adjustment system 640 may include actuator controller 642. Actuator controller 642 may be used by the restraint surface adjustment system 640 to actuate one or more restraint surface adjustment mechanisms. For instance, the actuator controller 642 may receive instructions from a processor, such as processors 616 and 633, to actuate one or more restraint surface adjustment mechanisms of the restraint surface adjustment system 640. In this way, the actuator controller 642 may actuate a specific restraint surface adjustment mechanism of the restraint surface adjustment system 640.

It should be noted that while FIG. 6 is illustrated as a distributed system, in alternative examples, components of the vehicle 602 may be associated with the computing device(s) 630, and/or components of the computing device(s) 630 may be associated with the vehicle 602. That is, the vehicle 602 may perform one or more of the functions associated with the computing device(s) 630, and vice versa.

Figure 7A:
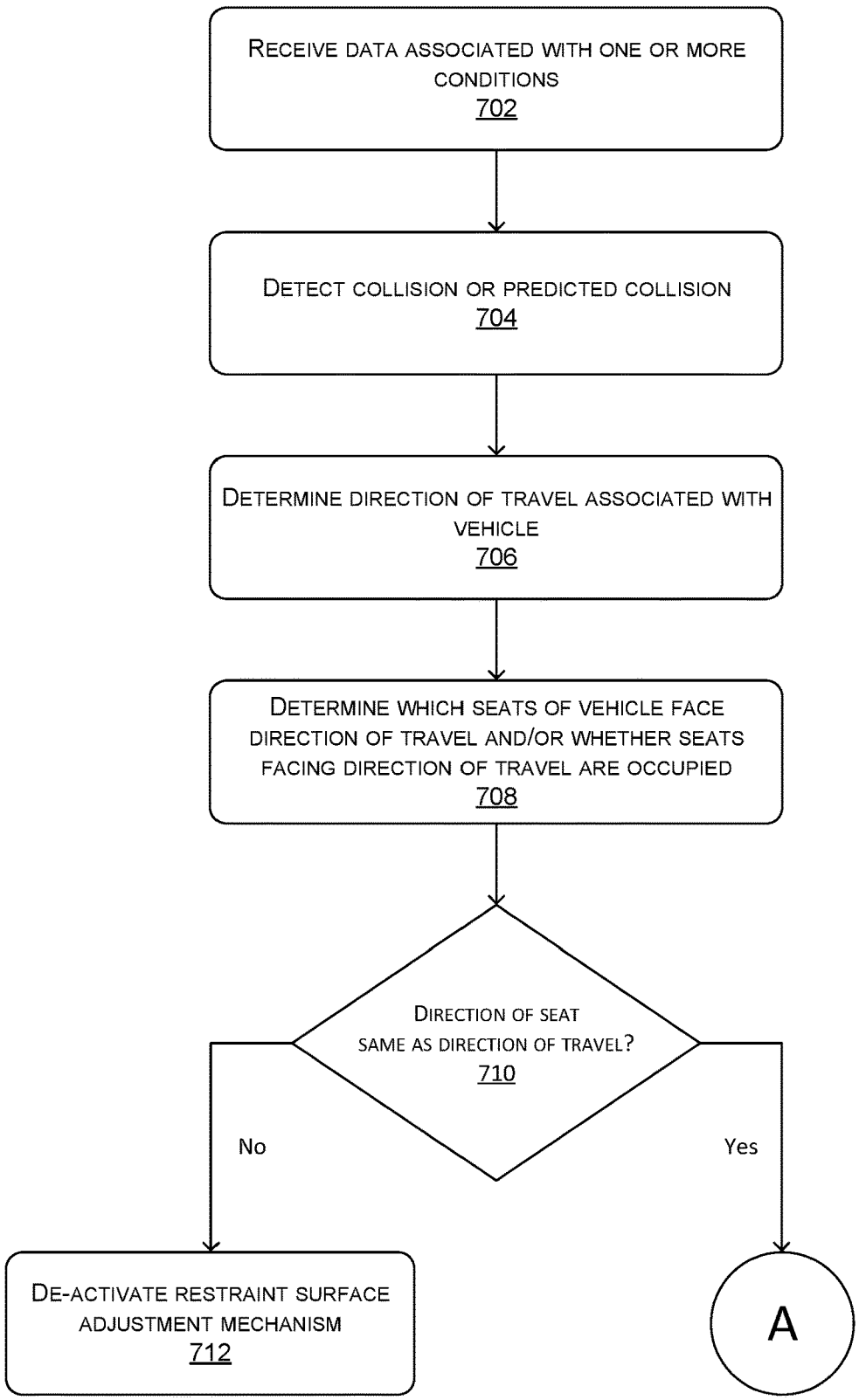
FIG. 7A illustrates a first portion of a flow diagram of an example process for actuating a restraint surface adjustment mechanism.
Figure 7B:
FIG. 7B illustrates a second portion of the flow diagram of the example process for actuating the restraint surface adjustment mechanism.

FIG. 7A and FIG. 7B illustrate a flow diagram of an example process 700 for actuating a restraint surface adjustment system. The process described herein is illustrated as collections of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process is described with reference to the environments, architectures and systems described in the examples herein, such as, for example those described with respect to FIGS. 1-6, although the process may be implemented in a wide variety of other environments, architectures, and systems.

At block 702, the process 700 may include receiving data associated with one or more conditions (e.g., conditions associated with the vehicle and/or conditions associated with an environment in which the vehicle operates). In some examples, the data may be data from one or more sensors of the vehicle. For instance, the data may be from one of sensor systems 606. In some examples, the one or more conditions may be associated with a collision between the vehicle and another vehicle or other object. For example, the sensor data may detect an impact based on, for example, internal measurement unit (IMU) data. In further examples, the one or more conditions may correspond to a predicted collision. For instance, a prediction system of the vehicle may predict that a collision is likely to occur based on a trajectory of one or more objects and a trajectory of the vehicle. In some examples, the data may indicate a size of an object with which the vehicle is about to collide and/or a speed of the object relative to the vehicle, such that a computing device associated with the vehicle can predict a force of impact or severity of the actual or predicted collision.

At block 704, the process 700 may include detecting at least one of a collision and/or a predicted collision. In some examples, the detecting of the collision and/or the predicted collision may be based at least in part on receiving the data from the one or more sensors of the vehicle associated with the one or more conditions as described above in block 702. In some examples, the detected collision may be an actual collision. For instance, the vehicle may have already made impact with another vehicle or another mass object. Additionally, or alternatively, the detected collision may be a predicted collision in which the vehicle has not made impact with the other vehicle or other mass object yet. However, in such a predicted collision example, the vehicle may make such an impact in the very near future.

At block 706, the process 700 may include determining a direction of travel associated with the vehicle. In some examples, the vehicle may be an autonomous, bidirectional vehicle comprising carriage, bench-type seating. In that case, the vehicle may determine which bench seat of the vehicle is facing in the forward direction in which the vehicle is traveling. In some examples, the direction of travel may be determined by a computing device of the vehicle, such as vehicle computing device 604, based at least in part on data received by one or more sensors of the vehicle.

In some examples, determining a direction of travel associated with the vehicle may further include determining a direction associated with a collision and/or a predicted collision (e.g., a direction from which a collision occurs, a trajectory of a colliding object, etc.). For instance, the vehicle may be stopped at a traffic light and the collision and/or predicted collision may be a rear-end collision (e.g., a collision with a trailing end of the vehicle) in which an occupant (e.g., a rear-facing occupant) experiences chest and/or pelvic deflection. In such an example, the direction of the collision and/or the predicted collision may be used to determine whether to actuate a restraint surface adjustment mechanism.

At block 708, the process 700 may include determining which seats of the vehicle are facing in the direction of travel and/or whether the seat(s) facing in the direction of travel are occupied. For example, in the case of a bidirectional vehicle comprising carriage, bench-type seating for multiple occupants, a computing device of the vehicle may determine which bench seat of the vehicle is facing in the forward direction in which the vehicle is traveling. Additionally, or alternatively, the vehicle may determine if an occupant is seated in a seat facing in the direction of travel. For instance, if there is only one occupant in the vehicle and that occupant is not seated facing in the direction of travel, the vehicle may determine not to actuate the restraint surface adjustment mechanism because there is no occupant to restrain in the seat facing the direction of travel.

At block 710, the process 700 may include determining whether the direction of a seat is facing in the same direction as the direction of travel of the vehicle. If a seat is not facing in the direction of travel of the vehicle (or is unoccupied, or should otherwise not be actuated (e.g., where a child seat in located in a particular seating position)), at block 712, the process 700 may include deactivating a restraint surface adjustment mechanism of the seat of the vehicle based at least in part on determining that the seat is not facing in the direction of travel of the vehicle and/or that the seat is not in use by an occupant of the vehicle, etc. In at least some examples, such deactivation may comprise, for example, closing one or more valves to inflators associated with such positions. Additionally, or alternatively, such deactivation may simply comprise a determination not to actuate (e.g., engage an inflator). If at block 710, the computing device of the vehicle determines that a seat is facing in the direction of travel of the vehicle (and has at least one occupant), the process 700 proceeds to block 714 in FIG. 7B, at which a speed and/or velocity associated with the vehicle is determined. The speed and/or velocity associated with the vehicle may be determined based in part on data received from one or more sensors of the vehicle. In some examples, the vehicle may also determine a speed and/or velocity associated with an object, such as a second vehicle that is predicted to collide with the vehicle. In some examples, the vehicle may also determine a direction of collision associated with the vehicle (e.g., a direction of the vehicle from which the collision is occurring and/or impact is predicted to occur). The direction of collision may represent a direction or angle, relative to a pose or frame of reference of the vehicle. Additionally or alternatively, the direction of collision may represent a trajectory of an object that is colliding or predicted to collide with the vehicle.

At block 716, the process 700 may include determining whether the speed and/or velocity associated with the vehicle is less than, or greater than, a threshold speed. The threshold speed may be a speed above which forces exerted on an occupant by a seatbelt would be expected to cause injury to the occupant or an average occupant (e.g., a $50^{th}$ percentile male, a $5^{th}$ percentile woman, etc.). In some examples, the threshold speed may be an absolute speed of the vehicle. In some examples, the threshold speed may be a relative speed of the vehicle relative to another object (e.g., an object with which the vehicle is predicted to collide). By way of example and not limitation, the threshold speed may be 25 miles per hour, 35 miles per hour, 50 miles per hour. However, the threshold speed need not be so limited and could be any value suitable for the protection of one or more occupants of the vehicle. For instance, the threshold speed could be lower than 25 miles per hour or higher than 50 miles per hour. In some examples, the threshold speed may be variable and may be set based on one or more criteria. For instance, the vehicle may determine a mass of an object with which the vehicle is predicted to collide and, based at least in part on the mass of the object, may set the threshold speed to adequately protect occupants of the vehicle in case of a collision.

At block 718, the process 700 may include deactivating the restraint surface adjustment mechanism of one or more bench-type seats of the vehicle based at least in part on a determination that the vehicle speed and/or velocity does not exceed the threshold speed. In some examples, deactivating the restraint surface adjustment mechanism may comprise deactivating an inflator or another actuator of the restraint surface adjustment mechanism (e.g., by closing one or more valves associated with the bladder of the seat). In other examples, deactivating the restraint surface adjustment mechanism may comprise determining not to activate the restraint surface adjustment mechanism. For instance, the restraint surface adjustment mechanism, the inflator, and/or other actuating device may be actuated and/or controlled by an airbag controlling unit. In that case, deactivating the restraint surface adjustment mechanism may comprise sending instructions to the airbag control unit to not actuate the restraint surface adjustment mechanism and/or refraining from sending a control to an inflator.

At block 720, the process 700 may include determining one or more characteristics associated with one or more occupants. For instance, an occupant seated in a seat space of the bench-type seat of the vehicle may be a certain age, weight, height, size, etc. Accordingly, the vehicle may determine such a characteristic associated with an occupant and determine whether to activate or deactivate the restraint surface adjustment mechanism of the seat space of the occupant. For example, an occupant's weight or size may be actively determined based at least in part on data received from one or more sensors disposed in the seat of the vehicle. The sensors may be disposed in the seat tub, under the seat cushion, or in another location. In additional examples, the presence of a child-restraint seat may be detected based at least in part on sensor data from one or more other sensors of the vehicle (e.g., based on image data captured by a camera in a passenger compartment of the vehicle and performing object detection and classification on the image to detect the presence of a child-restraint seat).

At block 722, the process 700 may include determining whether the characteristic associated with the occupant exceeds a specific characteristic threshold (e.g., a threshold weight or size associated with the occupant). The vehicle may determine whether to actuate the restraint surface adjustment mechanism based on whether or not an occupant exceeds the characteristic threshold. As such, a computing device of the vehicle may receive data from one or more sensors corresponding to a weight or size of one or more occupants seated in various seat spaces of the vehicle. Based on the sensor data, the vehicle may determine, for each seating space, whether the occupant's weight or size exceeds a threshold weight or size.

At block 724, the process 700 may include deactivating the restraint surface adjustment mechanism of one or more bench-type seats of the vehicle based at least in part on a determination that a characteristic of an occupant does not exceed the specific characteristic threshold. For instance, the vehicle may determine to deactivate the restraint surface adjustment mechanism based at least in part on an occupant not meeting the specific characteristic threshold for an occupant's weight, height, or other characteristic threshold.

At block 726, the process 700 may include actuating an inflator and/or other actuator to actuate one or more restraint surface adjustment mechanisms. In some examples, actuating the inflator and/or other actuator may comprise sending instructions to an airbag control unit that the restraint surface adjustment mechanism should be deployed. For instance, if the vehicle detects a collision and/or a predicted collision, the vehicle may send instructions to deploy one or more restraint surface adjustment mechanisms based at least in part on determining that a seat is facing in the direction of travel, a speed of the vehicle exceeds a threshold speed, and/or a characteristic of an occupant meets a characteristic threshold. In at least some examples, actuation may be based at least in part on the characteristics. As a non-limiting example, a rate of inflation may be based at least in part on a weight and/or size of a passenger associated with the seating position.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. An example vehicle comprising: a bench seat to accommodate multiple occupants, the bench seat comprising a first seat space to accommodate a first occupant and a second seat space to accommodate a second occupant; a first inflatable bladder associated with the first seat space to adjust at least one of a height or an angle of a first restraint surface of the first seat space; a second inflatable bladder associated with the second seat space to adjust at least one of a height or an angle of a second restraint surface of the second seat space; and an inflator disposed between the first inflatable bladder and the second inflatable bladder, the inflator being in fluid communication with the first inflatable bladder and the second inflatable bladder.

B. The vehicle as example A recites, the vehicle further comprising: one or more processors; one or more sensors; and one or more computer readable media storing instructions that, when executed, cause the vehicle to perform operations comprising: detecting, based at least in part on data from the one or more sensors, at least one of a collision or a predicted collision; determining a direction of travel associated with the vehicle; and actuating, based at least in part on the at least one of the collision or the predicted collision and the direction of travel associated with the vehicle, the inflator to inflate at least one of the first inflatable bladder or the second inflatable bladder.

C. The vehicle as any one of examples A or B recites, the vehicle further comprising: a first bladder-inflation tube coupled to the first adjustment bladder; a second bladder-inflation tube coupled to the second adjustment bladder; and a manifold coupled to the inflator, the first bladder-inflation tube, and the second bladder-inflation tube to provide fluid from the inflator to: the first inflatable bladder via the first bladder-inflation tube; and the second inflatable bladder via the second bladder-inflation tube.

D. The vehicle as any one of examples A-C recites, the vehicle further comprising: a first bladder-inflation tube coupled to the first inflatable bladder; and a second bladder-inflation tube coupled to the second inflatable bladder; wherein the inflator is coupled inline between the first bladder-inflation tube and the second bladder-inflation tube to provide fluid from the inflator to: the first inflatable bladder via the first bladder-inflation tube; and the second inflatable bladder via the second bladder-inflation tube.

E. The vehicle as any one of examples A-F recites, wherein the bench seat comprises: a seat tub; and a seat cushion; and wherein the first inflatable bladder and the second inflatable bladder are disposed between the seat cushion and the seat tub.

F. An example safety system for a seat in a vehicle comprising: a seat having a first seat space to accommodate a first occupant and a second seat space to accommodate a second occupant, the seat comprising: a cushion; and a restraint surface adjustment mechanism, the restraint surface adjustment mechanism disposed under the cushion to adjust at least one of a height or an angle of a restraint surface associated with at least one of the first seat space or the second seat space.

G. The safety system as example F recites, wherein the restraint surface adjustment mechanism comprises an inflatable bladder.

H. The safety system as any one of examples F or G recites, wherein the restraint surface adjustment mechanism comprises a first restraint surface adjustment mechanism, the first restraint surface adjustment mechanism disposed under the first seat space, and the safety system further comprises a second restraint surface adjustment mechanism, the second restraint surface adjustment mechanism disposed under the second seat space.

I. The safety system as any one of examples F-H recites, wherein the first restraint surface adjustment mechanism comprises a first inflatable bladder and the second restraint surface adjustment mechanism comprises a second inflatable bladder.

J. The safety system as any one of examples F-I recites, further comprising an inflator, the inflator disposed between and in fluid communication with the first inflatable bladder and the second inflatable bladder.

K. The safety system as any one of examples F-J recites, wherein the safety system further comprises: a bladder inflation tube coupled to at least one of the first inflatable bladder or the second inflatable bladder; and an inflator, the inflator coupled to the bladder inflation tube and in fluid communication with at least one of the first inflatable bladder or the second inflatable bladder.

L. The safety system as any one of examples F-K recites, the safety system further comprising a seat tub disposed under the cushion, wherein the first restraint surface adjustment mechanism is disposed between the seat tub and the cushion proximate the first seat space, and the second restraint surface adjustment mechanism is disposed between the seat tub and the cushion proximate the second seat space.

M. The safety system as any one of examples F-L recites, further comprising: one or more processors; and one or more computer-readable media storing instructions that, when executed, cause the safety system to perform acts comprising: detecting, based at least in part on receiving data from one or more sensors, at least one of a collision or a predicted collision; determining a direction of travel associated with the vehicle; and causing, based at least in part on the detecting of the collision or the predicted collision and the direction of travel associated with the vehicle, the restraint surface adjustment mechanism to actuate to adjust the at least one of the height or the angle of the restraint surface associated with the at least one of the first seat space or the second seat space.

N. The safety system as any one of examples F-M recites, wherein the restraint surface adjustment mechanism comprises a movable adjustment plate, the safety system further comprising an actuator that is configured, when actuated, to apply a force to at least a portion of the adjustment plate to cause the adjustment plate to move to adjust the at least one of the height or the angle of the restraint surface associated with the at least one of the first seat space or the second seat space.

O. An example seat comprising: a first seat space to accommodate a first occupant; a second seat space to accommodate a second occupant; and a restraint surface adjustment mechanism, the restraint surface adjustment mechanism proximate at least one of the first seat space or the second seat space to adjust at least one of a height, an angle, or a rigidity of a restraint surface associated with the first seat space or the second seat space.

P. The seat as example O recites, further comprising: a cushion; and a seat tub, the seat tub disposed under the cushion, wherein the restraint surface adjustment mechanism is disposed between the cushion and the seat tub proximate at least one of the first seat space or the second seat space.

Q. The seat as any one of examples O or P recites, wherein the restraint surface adjustment mechanism comprises an inflatable bladder, the seat further comprising an inflator in fluid communication with the inflatable bladder.

R. The seat as any one of examples O-Q recites, wherein the restraint surface adjustment mechanism comprises a first restraint surface adjustment mechanism proximate the first seat space, the seat further comprising: a second restraint surface adjustment mechanism proximate the second seat space; and a cushion disposed above the first restraint surface adjustment mechanism and the second restraint surface adjustment mechanism.

S. The seat as any one of examples O-R recites, wherein the first restraint surface adjustment mechanism comprises a first inflatable bladder, and wherein the second restraint surface adjustment mechanism comprises a second inflatable bladder.

T. The seat as any one of examples O-S recites, wherein the restraint surface adjustment mechanism comprises at least one of: a movable adjustment plate and an actuator that is configured, when actuated, to apply a force to at least a portion of the adjustment plate to cause the adjustment plate to move to adjust the at least one of the height or the angle of the restraint surface associated with at least one of the first seat space or the second seat space; or an adjustable material and an actuator that is configured, when actuated, to apply a stimulus to the adjustable material to adjust the rigidity of the restraint surface associated with at least one of the first seat space or the second seat space.

U. An example system for restraining an occupant of a vehicle comprising: one or more processors; and one or more computer readable media storing instructions that, when executed by the one or more processors, configure the one or more processors to perform operations comprising: receiving, from one or more sensors of the vehicle, data corresponding to a condition associated with the vehicle; detecting, based at least in part on the data, at least one of a collision or a predicted collision; determining at least one of a direction of travel associated with the vehicle or a direction of collision associated with the collision or predicted collision; determining a bench seat of the vehicle that is facing in the at least one of the direction of travel or the direction of collision; and actuating a restraint surface adjustment mechanism of the bench seat of the vehicle facing in the at least one of the direction of travel or the direction of collision to cause a portion of a restraint surface associated with the bench seat of the vehicle to adjust at least one of a height, angle, or rigidity of the restraint surface.

V. The system as example U recites, the operations further comprising: determining, based at least in part on the data, a speed of travel associated with the vehicle; and wherein actuating the restraint surface adjustment mechanism of the bench seat is further based at least in part on determining that the speed of travel associated with the vehicle meets or exceeds a threshold speed of travel.

W. The system as any one of examples U or V recites, the operations further comprising: determining, based at least in part on the data, a relative speed associated with the collision or the predicted collision, the relative speed associated with the collision or the predicted collision comprising a difference between a speed of the vehicle and a speed of an object with which the vehicle is colliding or predicted to collide; and wherein actuating the restraint surface adjustment mechanism of the bench seat is based at least in part on determining that the speed associated with the collision or the predicted collision meets or exceeds a threshold speed.

X. The system as any one of examples U-W recites, wherein: the bench seat comprises a first bench seat facing in a first direction; the vehicle comprises the first bench seat and a second bench seat facing in a second direction opposite the first direction; and determining the bench seat of the vehicle that is facing in the at least one of the direction of travel or the direction of collision further comprises determining that the at least one of the direction of travel or the direction of collision corresponds to the first direction.

Y. The system as any one of examples U-X recites, the operations further comprising: receiving, from the one or more sensors of the vehicle, data indicating a characteristic associated with an occupant of the bench seat; and based at least in part on the characteristic associated with the occupant, refraining from actuating the restraint surface adjustment mechanism of the bench seat.

Z. The system as any one of examples U-Y recites, wherein the characteristic associated with the occupant comprises at least one of a size, weight, or a child seat associated with the occupant.

AA. An example method comprising: receiving, from one or more sensors of the vehicle, data indicating a trajectory of the vehicle; detecting, based at least in part on the trajectory of the vehicle, at least one of a collision or a predicted collision; determining a direction of travel associated with the vehicle; determining a bench seat of the vehicle that is facing in the direction of travel; and based at least in part on detecting the at least one of the collision or the predicted collision, actuating a restraint surface adjustment mechanism of the bench seat of the vehicle facing in the direction of travel to adjust at least one of a height, an angle, or a rigidity of a restraint surface associated with the bench seat.

BB. The method as example AA recites, wherein: the bench seat comprises a first bench seat facing in a first direction; the vehicle comprises the first bench seat and a second bench seat facing in a second direction opposite the first direction; and determining the bench seat of the vehicle that is facing in the direction of travel further comprises determining that the direction of travel corresponds to the first direction.

CC. The method as any one of examples AA or BB recites, further comprising: receiving, from the one or more sensors of the vehicle, data indicating that at least one seating space of the bench seat is occupied by an occupant; wherein actuating the restraint surface adjustment mechanism is further based at least in part on the data indicating that the at least one seating space of the bench seat is occupied by the occupant.

DD. The method as any one of examples AA-CC recites, further comprising: determining, based at least in part on the trajectory of the vehicle, a speed of travel associated with the vehicle; and wherein actuating the restraint surface adjustment mechanism of the bench seat is further based at least in part on determining that the speed of travel associated with the vehicle meets or exceeds a threshold speed of travel.

EE. The method as any one of examples AA-DD recites, wherein the restraint surface adjustment mechanism comprises a first inflatable bladder proximate a first seat space of the bench seat and a second inflatable bladder proximate a second seat space of the bench seat, and wherein actuating the restraint surface adjustment mechanism of the bench seat comprises actuating an inflator to inflate the first inflatable bladder and the second inflatable bladder.

FF. The method as any one of examples AA-EE recites, wherein the restraint surface adjustment mechanism comprises at least one of: a movable adjustment plate, and wherein activating the restraint surface adjustment mechanism of the bench seat comprises actuating an actuator to apply a force to at least a portion of the movable adjustment plate to cause the movable adjustment plate to move to adjust the at least one of the height or the angle of the restraint surface associated with the bench seat; or an adjustable material, and wherein activating the restraint surface adjustment mechanism of the bench seat comprises applying a stimulus to the adjustable material to change the rigidity.

GG. An example method comprising: receiving, from one or more sensors of a vehicle, data corresponding to a condition associated with the vehicle; detecting, based at least in part on the data, a collision or a predicted collision; determining a direction of collision associated with the collision or the predicted collision; determining a bench seat of the vehicle facing in the direction of collision; and activating, based at least in part on the direction of collision, a restraint surface adjustment mechanism of the bench seat to adjust at least one of a height, an angle, or a rigidity of a restraint surface associated with the bench seat.

HH. The method as examples GG recites, further comprising receiving, from the one or more sensors of the vehicle, data indicating that at least one seat space of the bench seat is occupied by an occupant; wherein actuating the restraint surface adjustment mechanism is further based at least in part on the data indicating that the at least one seating space of the bench seat is occupied by the occupant.

II. The method as any one of examples GG or HH recites, further comprising: determining, based at least in part on the data, a relative speed associated with the collision or the predicted collision, the relative speed associated with the collision or the predicted collision comprising a difference between a speed of the vehicle and a speed of an object with which the vehicle is colliding or predicted to collide; and determining that the speed associated with the collision or the predicted collision meets or exceeds a threshold speed.

JJ. The method as any one of examples GG-II recites, further comprising: receiving, from the one or more sensors of the vehicle, data indicating a characteristic associated with an occupant of the bench seat; and based at least in part on the characteristic associated with the occupant, refraining from activating the restraint surface adjustment mechanism.

KK. The method as any one of examples GG-JJ recites, wherein the characteristic associated with the occupant comprises at least one of a size, weight, or a child seat associated with the occupant.

LL. The method as any one of examples GG-KK recites, wherein the restraint surface adjustment mechanism comprises an inflatable bladder, wherein activating the restraint surface adjustment mechanism of the bench seat comprises actuating an inflator to inflate the inflatable bladder, and wherein inflating the inflatable bladder increases a rigidity associated with the restraint surface.

MM. The method as any one of examples GG-LL recites, wherein the restraint surface adjustment mechanism comprises a first inflatable bladder proximate a first seat space of the bench seat and a second inflatable bladder proximate a second seat space of the bench seat, and wherein activating the restraint surface adjustment mechanism of the bench seat comprises actuating an inflator to inflate the first inflatable bladder and the second inflatable bladder.

NN. The method as any one of examples GG-MM recites, wherein the restraint surface adjustment mechanism comprises at least one of: a movable adjustment plate, and wherein activating the restraint surface adjustment mechanism of the bench seat comprises actuating an actuator to apply a force to at least a portion of the movable adjustment plate to cause the movable adjustment plate to move to adjust the at least one of the height or the angle of the restraint surface associated with the bench seat; or an adjustable material, and wherein activating the restraint surface adjustment mechanism of the bench seat comprises applying a stimulus to the adjustable material to change a physical property of the adjustable material.

Any or all of the examples A-NN may be combined with any other of the examples in any combination.

What is claimed is:

1. A vehicle comprising:
a bench seat to accommodate multiple occupants, the bench seat comprising a first seat space to accommodate a first occupant and a second seat space to accommodate a second occupant;
a first inflatable bladder associated with the first seat space to adjust at least one of a height or an angle of a first restraint surface of the first seat space;
a second inflatable bladder associated with the second seat space to adjust at least one of a height or an angle of a second restraint surface of the second seat space; and
an inflator disposed between the first inflatable bladder and the second inflatable bladder, the inflator being in fluid communication with the first inflatable bladder and the second inflatable bladder.

2. The vehicle of claim 1, the vehicle further comprising:
one or more processors;
one or more sensors; and
one or more computer readable media storing instructions that, when executed, cause the vehicle to perform operations comprising:
detecting, based at least in part on data from the one or more sensors, at least one of a collision or a predicted collision;
determining a direction of travel associated with the vehicle; and
actuating, based at least in part on the at least one of the collision or the predicted collision and the direction of travel associated with the vehicle, the inflator to inflate at least one of the first inflatable bladder or the second inflatable bladder.

3. The vehicle of claim 1, the vehicle further comprising:
a first bladder-inflation tube coupled to the first inflatable bladder;
a second bladder-inflation tube coupled to the second inflatable bladder; and
a manifold coupled to the inflator, the first bladder-inflation tube, and the second bladder-inflation tube to provide fluid from the inflator to:
the first inflatable bladder via the first bladder-inflation tube; and
the second inflatable bladder via the second bladder-inflation tube.

4. The vehicle of claim 1, the vehicle further comprising:
a first bladder-inflation tube coupled to the first inflatable bladder; and
a second bladder-inflation tube coupled to the second inflatable bladder;
wherein the inflator is coupled inline between the first bladder-inflation tube and the second bladder-inflation tube to provide fluid from the inflator to:
the first inflatable bladder via the first bladder-inflation tube; and
the second inflatable bladder via the second bladder-inflation tube.

5. The vehicle of claim 1, wherein the bench seat comprises:
a seat tub; and
a seat cushion; and
wherein the first inflatable bladder and the second inflatable bladder are disposed between the seat cushion and the seat tub.

6. A safety system for a seat in a vehicle, the safety system comprising:
a seat having a first seat space to accommodate a first occupant and a second seat space to accommodate a second occupant, the seat comprising:
a cushion;
a first restraint surface adjustment mechanism, the first restraint surface adjustment mechanism disposed under the cushion to adjust at least one of a height or an angle of a first restraint surface associated with the first seat space; and
a second restraint surface adjustment mechanism, the second restraint surface adjustment mechanism disposed under the cushion to adjust at least one of a height or an angle or a second restraint surface associated with the second seat space.

7. The safety system of claim 6, wherein the first restraint surface adjustment mechanism comprises an inflatable bladder.

8. The safety system of claim 6, wherein the first restraint surface adjustment mechanism comprises a first inflatable bladder and the second restraint surface adjustment mechanism comprises a second inflatable bladder.

9. The safety system of claim 8, further comprising an inflator, the inflator disposed between and in fluid communication with the first inflatable bladder and the second inflatable bladder.

10. The safety system of claim 8, wherein the safety system further comprises:
a bladder inflation tube coupled to at least one of the first inflatable bladder or the second inflatable bladder; and
an inflator, the inflator coupled to the bladder inflation tube and in fluid communication with at least one of the first inflatable bladder or the second inflatable bladder.

11. The safety system of claim 6, the safety system further comprising a seat tub disposed under the cushion, wherein the first restraint surface adjustment mechanism is disposed between the seat tub and the cushion proximate the first seat space, and the second restraint surface adjustment mechanism is disposed between the seat tub and the cushion proximate the second seat space.

12. The safety system of claim 6, further comprising:
one or more processors; and
one or more computer-readable media storing instructions that, when executed, cause the safety system to perform acts comprising:
detecting, based at least in part on receiving data from one or more sensors, at least one of a collision or a predicted collision;
determining a direction of travel associated with the vehicle;
causing, based at least in part on the detecting of the collision or the predicted collision and the direction of travel associated with the vehicle, the first restraint surface adjustment mechanism to actuate to adjust the at least one of the height or the angle of the first restraint surface associated with the first seat space.

13. The safety system of claim 6, wherein the first restraint surface adjustment mechanism comprises a movable adjustment plate, the safety system further comprising an actuator that is configured, when actuated, to apply a force to at least a portion of the adjustment plate to cause the adjustment plate to move to adjust the at least one of the height or the angle of the first restraint surface associated with the first seat space.

14. A seat comprising:
a first seat space to accommodate a first occupant;
a second seat space to accommodate a second occupant;
a first restraint surface adjustment mechanism, the first restraint surface adjustment mechanism proximate the first seat space to adjust at least one of a height, an angle, or a rigidity of a first restraint surface associated with the first seat space; and
a second restraint surface adjustment mechanism, the second restraint surface adjustment mechanism proximate the second seat space to adjust at least one of a height, an angle, or a rigidity of the second restraint surface associated with the second seat space.

15. The seat of claim 14, further comprising:
a cushion; and
a seat tub, the seat tub disposed under the cushion,
wherein the first restraint surface adjustment mechanism is disposed between the cushion and the seat tub proximate the first seat space and the second restraint surface adjustment mechanism is disposed between the cushion and the seat tub proximate to the second seat space.

16. The seat of claim 14, wherein the first restraint surface adjustment mechanism comprises a first inflatable bladder, the seat further comprising an inflator in fluid communication with the first inflatable bladder.

17. The seat of claim 14, wherein the first restraint surface adjustment mechanism comprises a first inflatable bladder, and wherein the second restraint surface adjustment mechanism comprises a second inflatable bladder.

18. The seat of claim 14, wherein the first restraint surface adjustment mechanism comprises at least one of:
a movable adjustment plate and an actuator that is configured, when actuated, to apply a force to at least a portion of the adjustment plate to cause the adjustment plate to move to adjust the at least one of the height or the angle of the first restraint surface associated with the first seat space; or
an adjustable material and an actuator that is configured, when actuated, to apply a stimulus to the adjustable material to adjust the rigidity of the first restraint surface associated with the first seat space.

19. The vehicle of claim 1, wherein at least one of the first inflatable bladder or the second inflatable bladder is made of steel or aluminum.

20. The vehicle of claim 2, the operations further comprising refraining from inflating other of the first inflatable bladder or the second inflatable bladder.

\* \* \* \* \*